(12) United States Patent
Harada et al.

(10) Patent No.: US 7,499,514 B2
(45) Date of Patent: Mar. 3, 2009

(54) COMMUNICATION SYSTEM, RECEPTION APPARATUS AND METHOD, RECORDING MEDIUM AND PROGRAM

(75) Inventors: Tsutomu Harada, Kanagawa (JP); Kosuke Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 651 days.

(21) Appl. No.: 11/133,971

(22) Filed: May 20, 2005

(65) Prior Publication Data

US 2005/0271176 A1 Dec. 8, 2005

(30) Foreign Application Priority Data

Jun. 8, 2004 (JP) ............................ P2004-170130

(51) Int. Cl.
*H04L 7/00* (2006.01)

(52) U.S. Cl. ...................... 375/358; 375/354; 375/355; 455/502; 327/141

(58) Field of Classification Search ................ 375/354, 375/355, 358, 360, 361; 455/502; 327/141
See application file for complete search history.

(56) References Cited

U.S. PATENT DOCUMENTS 4,232,387 A * 11/1980 Cottatellucci ............... 714/707
4,281,292 A * 7/1981 Caldarella et al. ........... 329/307
6,879,651 B2 4/2005 Saeki

FOREIGN PATENT DOCUMENTS

JP 2002007322 1/2002
JP 2003263404 9/2003

* cited by examiner

*Primary Examiner*—David C Payne
*Assistant Examiner*—Leon Flores
(74) *Attorney, Agent, or Firm*—Bell, Boyd & Lloyd LLP

(57) ABSTRACT

A communication system, reception apparatus and method, recording medium and program are provided. A technique is provided wherein, even where means for synchronizing a reception clock with a transmission clock is not available, data transmitted can be received accurately with a high transmission capacity assured. The frequency of a transmission clock used by an apparatus of the sender side of data is set equal to that of a reception frequency used by an apparatus on the receiver side. If a sampling timing and a changing point of the value of transmission data do not coincide with each other, then the value of 1 or 0 of a noticed bit is decided from a sample value. However, if they coincide with each other, then the sample value assumes an intermediate value different from 1 and 0, and the value of the noticed bit is decided as a value opposite to the value of the immediately preceding bit.

5 Claims, 30 Drawing Sheets

PRIOR ART

FIG.7
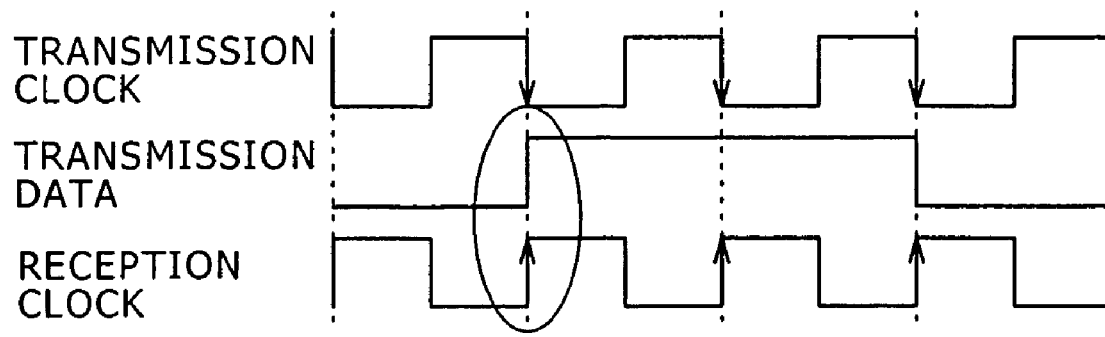
ENLARGED
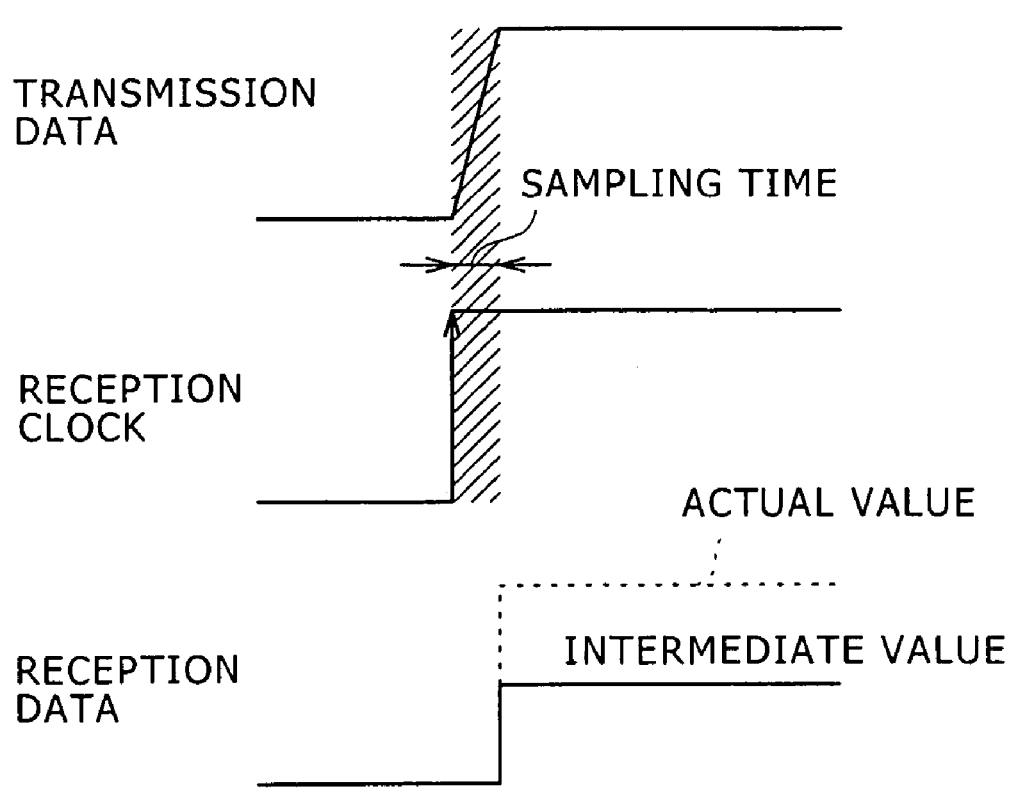

FIG.15
SYNCHRONIZING SIGNAL
      111110
2→3 BIT CONVERSION
      00→100
      01→101
      10→010
      11→011
EXAMPLE:
      1234h=0001_0010_0011_0100b
2→3 BIT CONVERSION   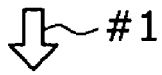#1
      100_101_100_010_100_011_101_100
SYNCHRONIZING
SIGNAL ADDITION   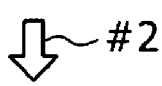#2
      111110_100_101_100_010_100_011_101_100

0,1...SAMPLE WHOSE LEVEL OF 0 OR 1 CAN BE RECEIVED WITH
   CERTAINTY BY RECEIVER SIDE BECAUSE NO CHANGE
   OF DATA HAS OCCURRED ON SENDER SIDE

M1 ...SAMPLE WITH WHICH 1→0 DATA CHANGE HAS OCCURRED
   ON SENDER SIDE

M2 ...SAMPLE WITH WHICH 0→1 DATA CHANGE HAS OCCURRED
   ON SENDER SIDE

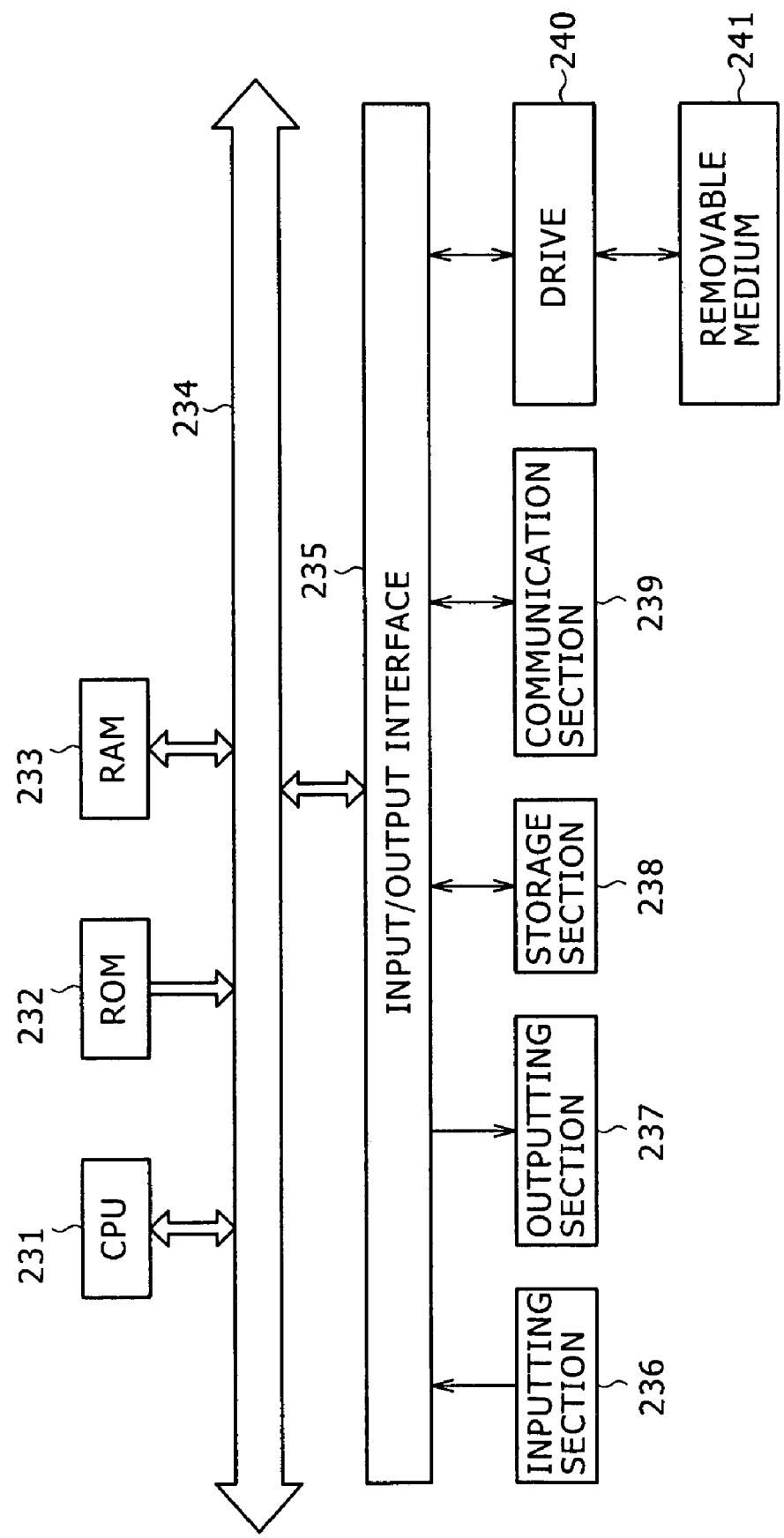

even receive supply of a transmission clock from the outside cannot sample data of a frequency higher than ½ the sampling frequency of the reception clock thereof.

COMMUNICATION SYSTEM, RECEPTION APPARATUS AND METHOD, RECORDING MEDIUM AND PROGRAM

CROSS REFERENCES TO RELATED APPLICATIONS

This application claims priority to Japanese Patent Document No. 2004-170130, filed on Jun. 8, 2004 with the Japanese Patent Office, which disclosure in its entirety is hereby incorporated by reference.

BACKGROUND OF THE INVENTION

The present invention relates to a communication system, a reception apparatus and method, a recording medium and a program, and more particularly to a communication system, a reception apparatus and method, a recording medium and a program wherein even where means for synchronizing a reception clock with a transmission clock is not available, data transmitted can be received accurately while a high transmission capacity is assured.

Usually, in data communication, it is necessary for an apparatus on the receiver side of data to keep a reception clock used for definition of a sampling period in synchronism with a transmission clock of the sender side in order to correctly sample the values (1, 0) of data transmitted from an apparatus of the sender side.

Two methods are available for synchronizing the reception clock with the transmission clock. According to one of the methods, the apparatus of the receiver side receives supply of a clock same as the transmission clock from the sender side or an external apparatus and uses the received clock as the reception clock. According to the other method, the apparatus itself of the receiver side reproduces a clock same as the transmission clock and uses the reproduced clock as the reception clock.

According to the former method, a line for sending a clock therethrough is required separately from a line for sending data therethrough. Therefore, the application of the method is restricted only to communication on a board or communication wherein a plurality of wiring lines are available.

FIG. 1 shows a configuration of a communication system which includes a transmission section 1 and a reception section 2.

Referring to FIG. 1, in order to send a clock from the transmission section 1 to the reception section 2 to establish synchronism of a reception clock, it is necessary to prepare a clock line 4 between the transmission section 1 and the reception section 2 separately from a data line or lines 3.

On the other hand, the latter method is used in serial communication (1-channel communication). In order for an apparatus on the receiver side to reproduce a transmission clock, a PLL (Phase Locked Loop) is used popularly.

FIG. 2 shows an example of a configuration of a PLL.

Referring to FIG. 2, the PLL shown includes, for example, a low-pass filter (LPF) 11, a phase comparator 12, a loop filter 13, and a voltage controlled oscillator (VCO) 14. The phase comparator 12 compares the phases of an output of the LPF 11 and an output of the VCO 14 with each other and outputs a phase error. The loop filter 13 compensates for the output of the phase comparator 12 and outputs a resulting signal to the VCO 14. The VCO 14 generates a clock of a phase corresponding to the output of the loop filter 13 and outputs the clock to the phase comparator 12 and the outside of the circuit. The clock outputted from the PLL is used as a reception clock.

For example, where transmitted and received signals are a bi-phase signal, the received signal exhibits a peak at a clock frequency and at another frequency equal to twice the clock frequency. In this instance, the transmission clock can be reproduced also by the receiver side by extracting the clock frequency by means of the LPF 11 and applying the PLL by the configuration at the following stage.

Where the PLL having such a configuration as described above handles a signal particularly of a high frequency region, it must be formed from an analog circuit and is not suitable for high integration. Further, since the PLL in principle requires considerable time before the phase is locked (synchronized), it is not suitable particularly for high speed communication.

Japanese Patent Laid-Open No. 2003-263404 discloses a technique wherein, upon starting of serial communication, a reset signal is transmitted to a reset terminal of the receiver side and the reset signal is used in later communication thereby to implement a circuit for communication of a small circuit scale.

Japanese Patent Laid-Open No. 2002-7322 discloses another technique wherein, where transmission and reception of data are performed between different units which use clocks which are same in frequency but different in phase between the sender side and the receiver side, a variable delay circuit whose delay time is controllable is provided on the unit on the receiver side to achieve stabilized data communication.

As described hereinabove, each of the two methods for assuring synchronism in the apparatus of the receiver side is disadvantageous in that a line for exclusive use for a clock is required in addition to a data line or that high integration cannot be achieved and much time is required to establish synchronism. Nevertheless, if the disadvantage is not permitted, then accurate data cannot be restored while the transmission capacity is assured.

Here, a reception apparatus is considered which fetches data successively transmitted thereto only at fixed intervals without establishing synchronism of a reception clock in order to perform communication without depending upon any of the two methods. The reception apparatus does not include synchronizing means by a PLL nor receives supply of a transmission clock from the outside.

The reception apparatus just described cannot correctly sample a signal of a frequency higher than ½ the sampling frequency from the sampling principle. Accordingly, in order to make it possible for the reception apparatus conversely to sample all values correctly, it is necessary to set the frequency of the transmission clock to a value lower than ½ the frequency (sampling frequency) of the reception clock. In other words, if means for establishing synchronism is not prepared in the reception apparatus, the actual transmission capacity drops to a value lower that at least ½ an estimated transmission characteristic, and this deteriorates the efficiency.

FIG. 3 illustrates missing of data which occurs when the frequency of the reception clock is low.

Referring to FIG. 3, the first one of three waveforms from above represents transmission data, and the second waveform represents a reception clock. Further, the third waveform represents reception data successfully obtained by sampling with the reception clock.

In the example illustrated in FIG. 3, although the transmission data are successfully sampled upon sampling at timings from time $t_1$ to time $t_8$, since the frequency of the reception clock is low, the value of 0 which should originally be obtained at time $t_9$ which is the next sampling timing misses.

In this manner, a reception apparatus to which a transmission clock is not supplied from the outside and which does not include a PLL sometimes fails, depending upon the speed of the reception clock, to accurately receive all data transmitted thereto. Further, in order to assure the reliability of the received data, there is the necessity to sufficiently lower the transmission capacity.

SUMMARY OF THE INVENTION

The present invention provides in an embodiment a communication system, a reception apparatus and method, a recording medium and a program wherein, even where means for synchronizing a reception clock with a transmission clock is not available, data transmitted can be received accurately while a high transmission capacity is assured.

According to an embodiment of the present invention, there is provided a communication system, including a transmission apparatus, and a reception apparatus. The transmission apparatus includes a transmission section for transmitting predetermined data to the reception apparatus using a clock of a frequency equal to that of a reception clock which is used by the reception apparatus as a transmission clock. The reception apparatus includes a decision section for deciding, where a sample value obtained by sampling a signal representative of the predetermined data in accordance with a cycle which depends upon the reception clock is within an intermediate range between a first range within which the value of a noticed bit can be decided to be 1 and a second range within which the value of the noticed bit can be decided to be 0, the value of the noticed bit as a value opposite to the value of the immediately preceding bit, and an acquisition section for acquiring the predetermined data based on a result of the decision by the decision section.

In the communication system, predetermined data are transmitted to the reception apparatus using a clock of a frequency equal to that of a reception clock which is used by the reception apparatus as a transmission clock. Further, if a sample value obtained by sampling a signal representative of the predetermined data in accordance with a cycle which depends upon the reception clock is within the intermediate range between the first range within which the value of a noticed bit can be decided to be 1 and the second range within which the value of the noticed bit can be decided to be 0, then the value of the noticed bit is decided as a value opposite to the value of the immediately preceding bit. Then, the predetermined data are acquired based on a result of the decision.

According to another embodiment of the present invention, there is provided a reception apparatus which receives, using a clock of a predetermined frequency as a reception clock, predetermined data transmitted thereto using a clock of a frequency equal to that of the reception clock as a transmission clock, including a decision section for deciding, where a sample value obtained by sampling a signal representative of the predetermined data in accordance with a cycle which depends upon the reception clock is within an intermediate range between a first range within which the value of a noticed bit can be decided to be 1 and a second range within which the value of the noticed bit can be decided to be 0, the value of the noticed bit as a value opposite to the value of the immediately preceding bit, and an acquisition section for acquiring the predetermined data based on a result of the decision by the decision section.

According to a further embodiment of the present invention, there is provided a reception method for receiving, using a clock of a predetermined frequency as a reception clock, predetermined data transmitted thereto using a clock of a frequency equal to that of the reception clock as a transmission clock, including a decision step of deciding, where a sample value obtained by sampling a signal representative of the predetermined data in accordance with a cycle which depends upon the reception clock is within an intermediate range between a first range within which the value of a noticed bit can be decided to be 1 and a second range within which the value of the noticed bit can be decided to be 0, the value of the noticed bit as a value opposite to the value of the immediately preceding bit, and an acquisition step of acquiring the predetermined data based on a result of the decision by the process of the decision step.

According to a still further embodiment of the present invention, there is provided a recording medium on which a computer-readable program for causing a computer to execute a process of receiving, using a clock of a predetermined frequency as a reception clock, predetermined data transmitted using a clock of a frequency equal to that of the reception clock as a transmission clock is recorded. The program includes a decision step of deciding, where a sample value obtained by sampling a signal representative of the predetermined data in accordance with a cycle which depends upon the reception clock is within an intermediate range between a first range within which the value of a noticed bit can be decided to be 1 and a second range within which the value of the noticed bit can be decided to be 0, the value of the noticed bit as a value opposite to the value of the immediately preceding bit, and an acquisition step of acquiring the predetermined data based on a result of the decision by the process of the decision step.

According to a yet further embodiment of the present invention, there is provided a program for causing a computer to execute a process of receiving, using a clock of a predetermined frequency as a reception clock, predetermined data transmitted thereto using a clock of a frequency equal to that of the reception clock as a transmission clock. The program includes a decision step of deciding, where a sample value obtained by sampling a signal representative of the predetermined data in accordance with a cycle which depends upon the reception clock is within an intermediate range between a first range within which the value of a noticed bit can be decided to be 1 and a second range within which the value of the noticed bit can be decided to be 0, the value of the noticed bit as a value opposite to the value of the immediately preceding bit, and an acquisition step of acquiring the predetermined data based on a result of the decision by the process of the decision step.

In the reception apparatus and method, recording medium and program, if a sample value obtained by sampling a signal representative of predetermined data in accordance with a cycle which depends upon the reception clock is within the intermediate range between the first range within which the value of a noticed bit can be decided to be 1 and the second range within which the value of the noticed bit can be decided to be 0, then the value of the noticed bit is decided as a value opposite to the value of the immediately preceding bit. Then, the predetermined data are acquired based on a result of the decision.

With the communication system, reception apparatus and method, recording medium and program, even where the receiver side does not include means for synchronizing a reception clock with a transmission clock, it can correctly receive data transmitted thereto.

Further, such reception of data can be performed accurately while a high transmission capacity is assured.

Further, the user can input a plurality of data at a time to a single inputting section.

Additional features and advantages of the present invention are described in, and will be apparent from, the following Detailed Description of the Invention and the figures.

BRIEF DESCRIPTION OF THE FIGURES

FIG. 7 is a waveform diagram illustrating waveforms which exhibit coincidence between a changing point of data and a sampling timing in an enlarged manner.

FIG. 15 is a view illustrating an example of a bit string obtained by the process of FIG. 14.

FIG. 35 is a block diagram showing an example of a configuration of a personal computer.

DETAILED DESCRIPTION OF THE INVENTION

The present invention relates to a communication system, a reception apparatus and method, a recording medium and a program, and more particularly to a communication system, a reception apparatus and method, a recording medium and a program wherein even where means for synchronizing a reception clock with a transmission clock is not available, data transmitted can be received accurately while a high transmission capacity is assured.

Figure 1:
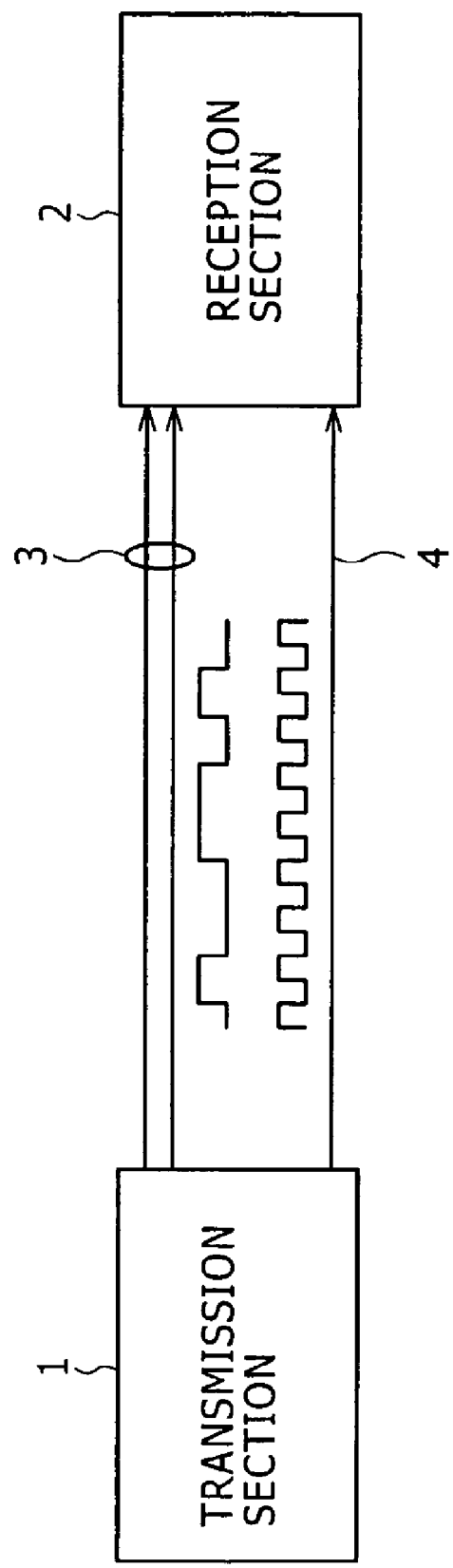
FIG. 1 is a block diagram showing a configuration of a conventional communication system.
Figure 2:
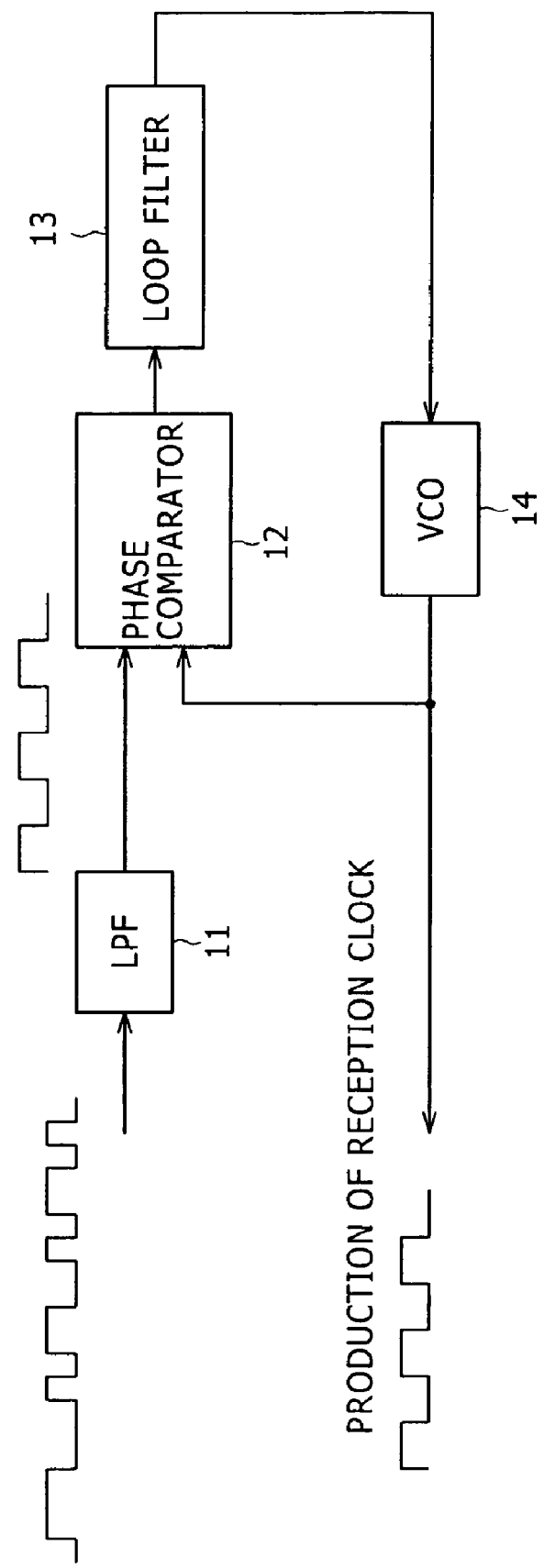
FIG. 2 is a block diagram showing a configuration of a PLL.
Figure 3:
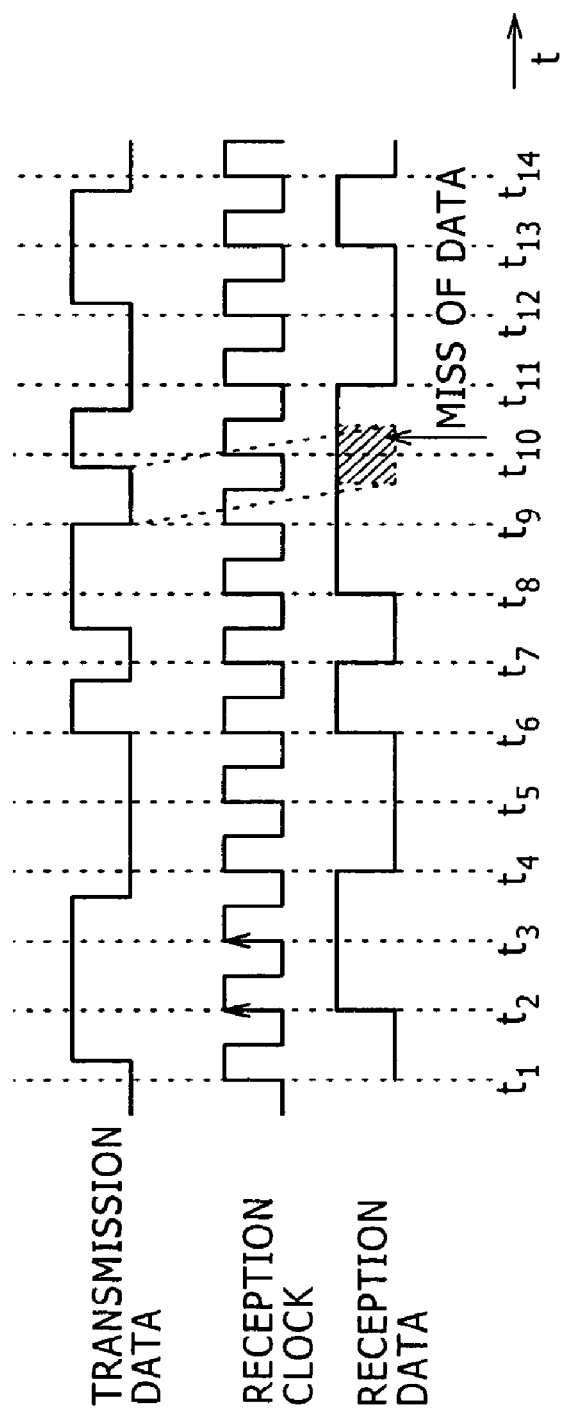
FIG. 3 is a waveform diagram illustrating missing of data.
Figure 4:
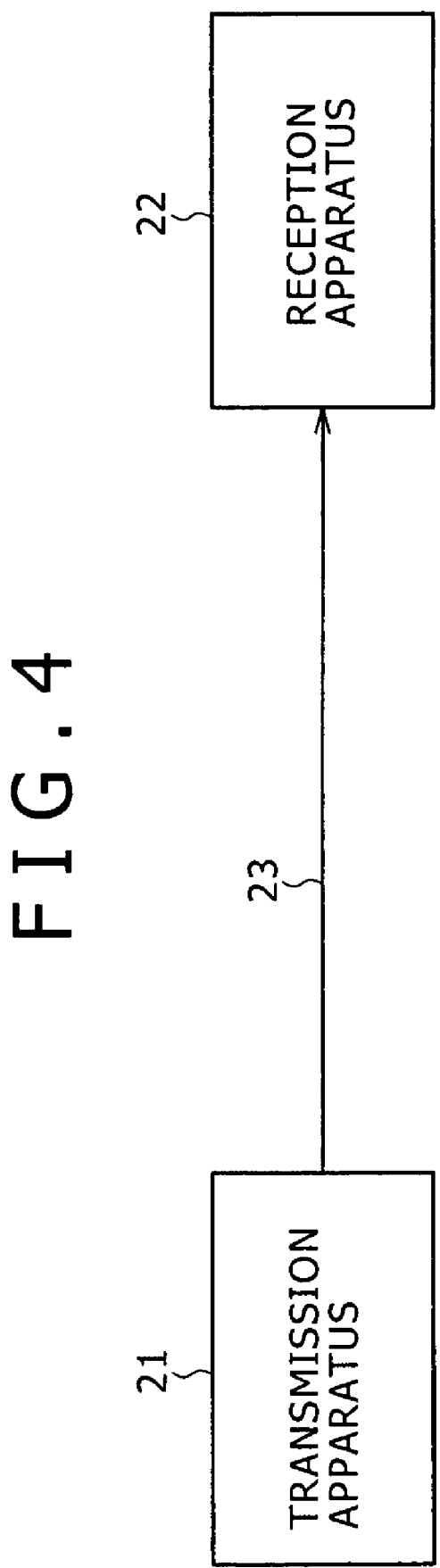
FIG. 4 is a block diagram showing an example of a configuration of a communication system to which the present invention is applied.

According to an embodiment of the present invention, there is provided a communication system including a transmission apparatus (for example, a transmission apparatus 21 shown in FIG. 4), and a reception apparatus (for example, a reception apparatus 22 shown in FIG. 4). The transmission apparatus includes a transmission section (for example, a transmission section 35 shown in FIG. 12) for transmitting predetermined data to the reception apparatus using a clock of a frequency equal to that of a reception clock which is used by the reception apparatus as a transmission clock. The reception apparatus includes a decision section (for example, a value decision section 55 shown in FIG. 13) for deciding, where a sample value obtained by sampling a signal representative of the predetermined data in accordance with a cycle which depends upon the reception clock is within an intermediate range between a first range (for example, a range of a value higher than an upper threshold value) within which the value of a noticed bit can be decided to be 1 and a second range (for example, a range of a value lower than a lower threshold value) within which the value of the noticed bit can be decided to be 0, the value of the noticed bit as a value opposite to the value of the immediately preceding bit, and an acquisition section (for example, a data restoration section 57 shown in FIG. 13) for acquiring the predetermined data based on a result of the decision by the decision section.

According to an embodiment of the present invention, there is provided a reception apparatus (for example, a reception apparatus 22 shown in FIG. 4) which receives, using a clock of a predetermined frequency as a reception clock, predetermined data transmitted thereto using a clock of a frequency equal to that of the reception clock as a transmission clock, including a decision section (for example, a value decision section 55 shown in FIG. 13) for deciding, where a sample value obtained by sampling a signal representative of the predetermined data in accordance with a cycle which depends upon the reception clock is within an intermediate range between a first range (for example, a range of a value higher than an upper threshold value) within which the value of a noticed bit can be decided to be 1 and a second range (for example, a range of a value lower than a lower threshold value) within which the value of the noticed bit can be decided to be 0, the value of the noticed bit as a value opposite to the value of the immediately preceding bit, and an acquisition section (for example, a data restoration section 57 shown in FIG. 13) for acquiring the predetermined data based on a result of the decision by the decision section.

According to an embodiment of the present invention, the reception apparatus further includes a light reception section (for example, an image pickup device 131 shown in FIG. 24) for receiving light from a light source which represents the predetermined data in a pattern of light emission of the light source, the decision section deciding the value of a bit which composes the predetermined data represented by a pattern of light emission of the light source based on the sample value obtained by sampling a signal representative of the level of light received by the light reception section, the acquisition section acquiring the predetermined data represented by the pattern of light emission of the light source based on a result of the decision by the decision section.

According to an embodiment of the present invention, the reception apparatus further includes a control section (for example, a controller 172 shown in FIG. 31) for controlling operation of a display unit (for example, an I/O display unit 151 shown in FIG. 25) which includes a pixel which can perform light emitting operation and light receiving operation, the light reception section including a pixel controlled so as to perform light receiving operation under the control of the control section.

According to an embodiment of the present invention, there is provided a reception method for receiving, using a clock of a predetermined frequency as a reception clock, predetermined data transmitted thereto using a clock of a frequency equal to that of the reception clock as a transmission clock, including a decision step (for example, a step S16 shown in FIG. 16) of deciding, where a sample value obtained by sampling a signal representative of the predetermined data in accordance with a cycle which depends upon the reception clock is within an intermediate range between a first range (for example, a range of a value higher than an upper threshold value) within which the value of a noticed bit can be decided to be 1 and a second range (for example, a range of a value lower than a lower threshold value) within which the value of the noticed bit can be decided to be 0, the value of the noticed bit as a value opposite to the value of the immediately preceding bit, and an acquisition step (for example, a step S21 shown in FIG. 16) of acquiring the predetermined data based on a result of the decision by the process of the decision step.

Also a program recorded on a recording medium according to an embodiment of the present invention and a program according to an embodiment of the present invention include steps similar to those of the reception method described above.

In the following, several embodiments of the present invention are described.

FIG. 4 shows an example of a configuration of a communication system to which the present invention is applied.

Referring to FIG. 4, the communication system includes a transmission apparatus 21 and a reception apparatus 22. A data line 23 is provided between the transmission apparatus 21 and the reception apparatus 22. No other line or the like than the data line 23 is provided for supplying a clock signal.

The transmission apparatus 21 transmits predetermined data to the reception apparatus 22 through the data line 23.

The reception apparatus 22 receives data transmitted from the transmission apparatus 21 asynchronously. The reception apparatus 22 includes no such means for synchronizing a reception clock with a transmission clock as a PLL (Phase Locked Loop).

In the communication system of FIG. 4, the frequency of the transmission clock used by the transmission apparatus 21 is equal to the frequency of the reception clock used in the reception apparatus 22, and consequently, communication with a transmission capacity equal to that of the transmission clock is implemented. In particular, if a drop of the code efficiency by encoding or a like factor is ignored, then asynchronous communication of 1 Mbps can be implemented using a transmission clock of, for example, 1 MHz.

According to the present communication method, there is no necessity to synchronize the clocks of the sender side and the receiver side with each other as hereinafter described in detail. Further, correct communication free from a miss of data can be achieved by constructing the format of data to be transmitted from the transmission apparatus 21 in response to frequency accuracies of both of the clocks.

Figure 5:
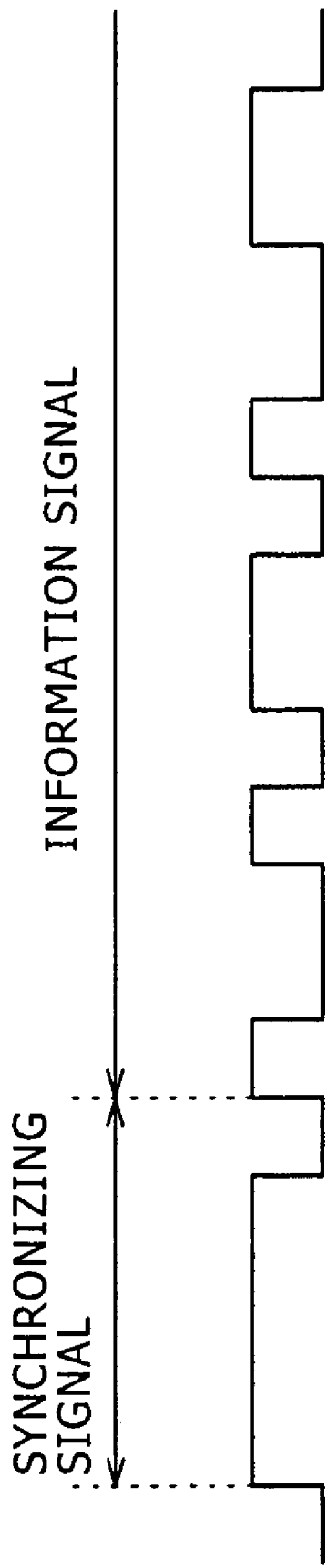
FIG. 5 is a waveform diagram illustrating an example of a format of data.

FIG. 5 illustrates an example of the format of data transmitted from the transmission apparatus 21 to the reception apparatus 22.

Referring to FIG. 5, the data encoded by the transmission apparatus 21 and transmitted to the reception apparatus 22 include a synchronizing signal and an information signal.

The synchronizing signal has a function of indicating a delimiter of a block of information. Further, the reception apparatus 22 suitably refers to the value of one bit immediately preceding to a noticed bit (bit of an object of decision of the value) to decide whether the value of the noticed bit is 1 or 0. Accordingly, in order to implement the present communication method, it is necessary that the value of at least one bit prior in time within a bit stream be settled by the reception apparatus 22 (that is, the value of the bit transmitted is decided correctly by the receiver side), and the synchronizing signal has a function of settling the bit.

Since the communication used in the communication system of FIG. 4 is asynchronous communication, it is difficult to settle a bit only with the information signal. Where the synchronizing signal is added, it is possible to make a decision of the value of a bit which forms the information signal following the synchronizing signal.

The information signal is data selected by the transmission apparatus 21 and transmitted to the reception apparatus 22.

Here, details of the communication performed by the communication system of FIG. 4 are described with reference to a waveform diagram of FIG. 6.

Figure 6:
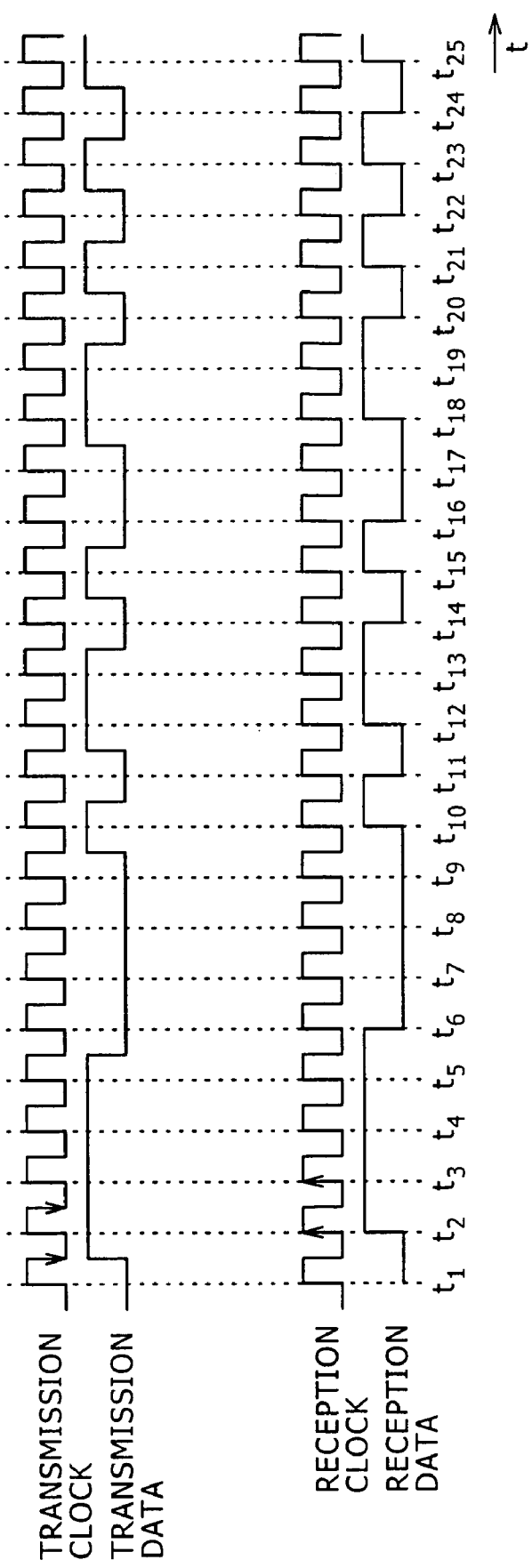
FIG. 6 is a waveform diagram illustrating an example of waveforms of the communication system of FIG. 4.

The four waveforms of FIG. 6 indicate, from above, a transmission clock used in the transmission apparatus 21, transmission data (including the synchronizing signal) transmitted to the reception apparatus 22, a reception clock used in the reception apparatus 22, and reception data sampled in a period determined from the reception clock and decided in regard to the value.

FIG. 6 illustrates a state wherein the transmission clock and the reception clock are unexpectedly in a mutually synchronous state. In this instance, since the transmission clock and the reception clock have an equal frequency, the timing (sampling timing) of a rising edge of the reception clock does not coincide with a changing point of the transmission data (timing at which the value of the transmission data changes).

In particular, this state is same as a state wherein the PLL exhibits a phase locked state. For a period of time before the synchronism is lost, for example, by an error in accuracy of oscillation of the reception apparatus 22, transmitted data are received as correct values by the reception apparatus 22 without any problem.

For example, at time $t_1$, a sample value lower than a certain threshold value is detected, and the value of a noticed bit (bit appearing within a period from time $t_1$ to time $t_2$) is decided to be 0. Further, at time $t_2$, a sample value higher than another threshold value is detected, and the value of another noticed bit (bit appearing within a period from time $t_2$ to time $t_3$) is decided to be 1.

Since the frequencies of the transmission clock and the reception clock are equal to each other, when the transmission clock and the reception clock are synchronized with each other unexpectedly, transmission of 1 bit of a correct value is implemented by one clock.

Further, even if the phases of the transmission clock and the reception clock do not coincide fully with each other, unless a sampling timing and a changing point of transmission data do not coincide with each other, it is possible to decide, from the sample value and the threshold values set in advance, whether the value of the noticed bit is 1 or 0. Also in this instance, transmission of one bit of a correct value is implemented by one clock.

In the following description, the threshold value with which it is decided from a sample value that the value of the notice bit is 1 is suitably referred to as upper threshold value, and the threshold value with which it is decided from the sample value that the value of the noticed bit is 0 is suitably referred to as lower threshold value. If the sample value is higher than the upper threshold value, then the value of the noticed bit is decided to be 1, but if the sample value is lower than the lower threshold value, then the value of the noticed bit is decided to be 0. However, if the sample value is lower than the upper threshold value but higher than the lower threshold value, then the value is referred to as intermediate value.

Another case is considered wherein a changing point of transmission data and a sampling timing coincide with each other conversely.

When a timing at which the value of the transmission data changes, that is, a timing at which the value of the transmission data changes from 1 to 0 or from 0 to 1 and a sampling timing substantially coincide with each other, the sample value is an intermediate value, and the reception apparatus 22 cannot decide whether the sample value is 1 or 0.

FIG. 7 shows the waveforms in an enlarged fashion where a changing point and a sampling timing coincide with each other.

The three waveforms at an upper portion in FIG. 7 illustrate the transmission clock, transmission data and reception clock from above, respectively. At a timing indicated by a solid line ellipse, a timing at which the value of transmission data changes from 0 to 1 and a sampling timing coincide with each other.

In this instance, since the time of sampling is not completely 0 as seen from a waveform portion forwardly of a void arrow mark, and since the value of the transmission data does not change at a moment but changes over a predetermined interval of time, the value sampled assumes an intermediate value between the value 1 of the noticed bit and the value 0 of the immediately preceding bit as seen from the lowest waveform shown in FIG. 7. It is to be noted that a waveform indicated by a broken line represents reception data which should have been decided to be the value 1 if the changing point and the sampling timing had not coincided with each other.

Since the frequencies of the transmission clock and the reception clock are equal to each other, where the transmission data exhibit repetitions of the values of 1 and 0, a sampling timing and a changing point coincide with each other without fail and a sample value exhibits an intermediate value within a limited period of time before a difference in phase is caused by an error in accuracy of an oscillator. Therefore, the value cannot be decided within the period of time.

Further, even where the transmission data do not exhibit repetitions of the values of 1 and 0, unless the same value successively appears twice or more, the sample value assumes an intermediate value, and there is the possibility that the value cannot be decided.

Since the fact that the sample value is an intermediate value represents that the value of the transmission data is changing from 1 to 0 or from 0 to 1 at the sampling timing as seen from FIG. 7, it is considered that, if the value of one bit can be decided correctly, then the value of any later bit can be estimated from the sample value which assumes an intermediate value (detection of the presence of a changing point) and the value of one bit immediately preceding to the sample value.

In particular, if it is assumed that the value of a certain one bit is correctly decided as 1 by the reception apparatus 22, then if an intermediate value is sampled at a sampling timing of a next noticed bit, since this represents occurrence of a change of the value of the transmission data (from 1 to 0), the value of the noticed bit can be estimated to be 0.

On the contrary, if it is assumed that the value of a certain one bit is correctly decided as 0 by the reception apparatus 22, then if an intermediate value is sampled at a sampling timing of a next noticed bit, then since this represents occurrence of a change of the value of the transmission data (from 0 to 1), the value of the noticed bit can be estimated to be 1.

The decision of a value performed by such estimation is described with reference to FIG. 8.

Figure 8:
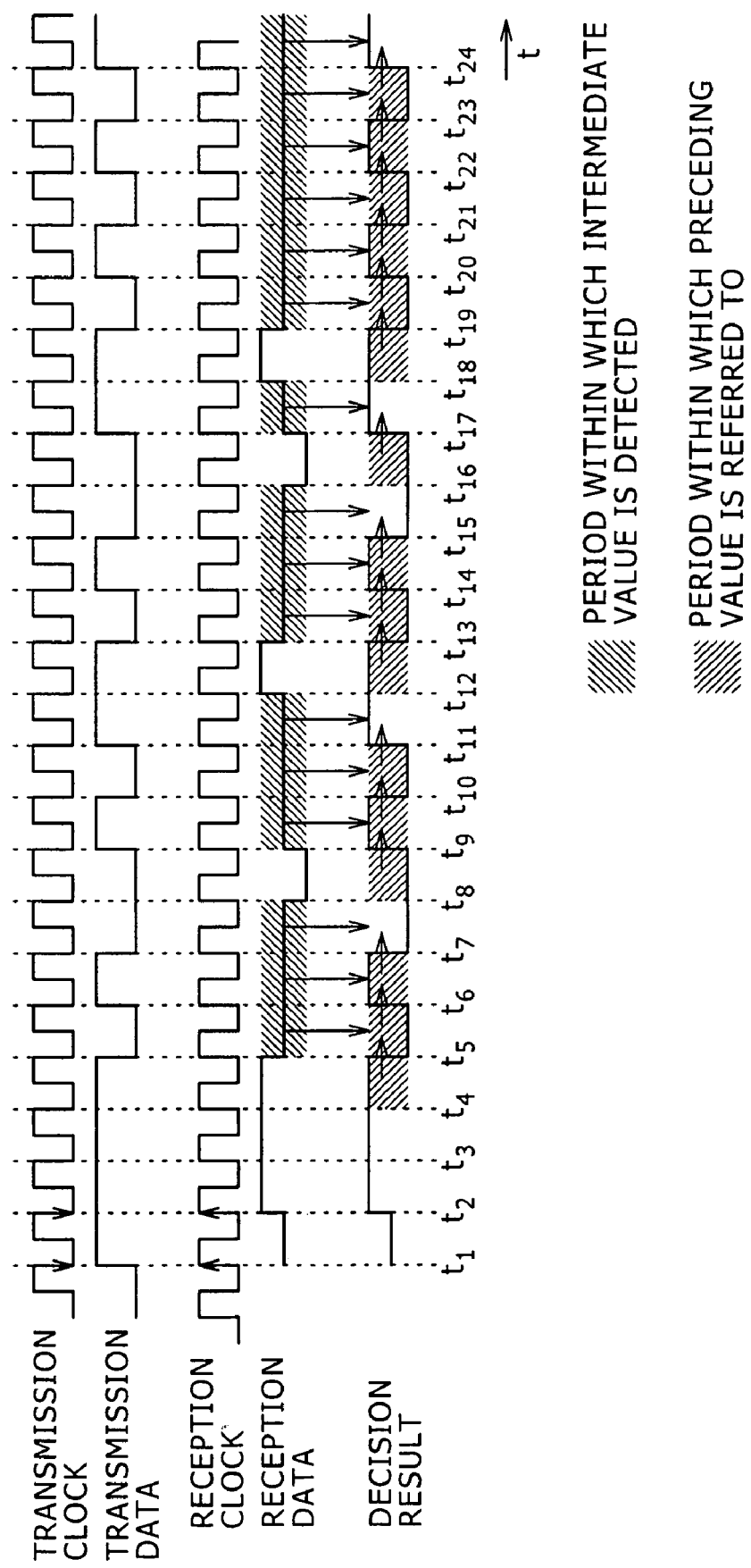
FIG. 8 is a waveform diagram illustrating another example of waveforms of the communication system of FIG. 4.

Referring to FIG. 8, the waveforms shown represent a transmission clock, transmission data, a reception clock and reception data (sampled values) from above. The reception data exhibit not only the values 1 and 0 but also an intermediate value. Further, the waveform at the lowest position in FIG. 8 indicates data formed from the values of 1 and 0 decided as a final decision result based on the reception data indicated above the lowest waveform. In the example, since a changing point of the transmission data and a sampling timing coincide with each other at time $t_1$, all of changing points and sampling timings which appear later than time $t_1$ coincide with each other.

In the example of FIG. 8, the transmission data from time $t_1$ to time $t_{24}$ include bits of the values of "111101001011010011010". Among the bits, the four successive bits of the value 1 from time $t_1$ to $t_5$ and the one following bit of the value 0 form the synchronizing signal. Accordingly, the bits at time $t_6$ et seq. form the information signal.

As described hereinabove, the synchronizing signal has a function for causing the reception apparatus 22 to settle a bit. The synchronizing signal includes a pattern of 1 and 0 which does not appear in the information signal, and the transmission apparatus 21 performs bit conversion for data to be transmitted so that the pattern of "1110" does not appear in the information signal except the top of the synchronizing signal "11110".

Where the same value successively appears by a predetermined number of times, the reception apparatus 22 can correctly decide a number of bits smaller by one than the number of successive bits at least irrespective of preceding and following data.

In particular, even where a sampling timing at time $t_1$ and a changing point coincide with each other as seen in FIG. 8 and the value of the noticed bit cannot be decided only from the sample value, since no changing point appears within a period from time $t_2$ to time $t_4$, the reception apparatus 22 can correctly decide the values of the three bits except the top bit from among the four successive bits based on the sample values at the timings of times $t_2$, $t_3$ and $t_4$.

Further, in the example illustrated in FIG. 8, since the synchronizing signal is formed from bits of the values of "11110", a changing point and a sampling timing coincide with each other at time $t_5$ and an intermediate value is sampled. In this instance, the reception apparatus 22 recognizes that a changing point exists at time $t_5$ and decides 0, which is the value opposite to the value of the immediately preceding bit (bit sampled at time $t_4$), as the value of the noticed bit.

Consequently, the reception apparatus 22 can identify the synchronizing signal from any other signal by detecting three successive bits of the value of 1 and one following bit of the value of 0 obtained before sampling at time $t_5$, that is, the pattern of "1110" which does not appear in the information signal as a result of such bit conversion as described above. Thus, the following data can be handled as the information signal.

Since the value 0 at the tail end of the synchronizing signal is a value which is guaranteed to be a correct value (since the bit is a bit which has been settled successfully), the reception apparatus 22 can use the settled value of the bit for decision of later values.

Similarly, when an intermediate value is sampled at time $t_6$, the reception apparatus 22 recognizes that a changing point exists at time $t_6$ and decides 1, which is the value opposite to the value of the tail end bit of the synchronizing signal immediately preceding thereto, as the value of a noticed bit which appears within a period from time $t_6$ to time $t_7$.

Where a sample value is an intermediate value in this manner, the value opposite to that of the immediately preceding bit is decided as the value of the noticed bit. Thus, by successively performing the decision, the reception apparatus 22 can correctly decide the values of bits which form the information signal following the synchronizing signal.

In the example of FIG. 8, an intermediate value is sampled at each of sampling timings of times $t_7$, $t_9$ to $t_{11}$, $t_{13}$ to $t_{15}$, $t_{17}$ and $t_{19}$ to $t_{24}$ after time $t_6$, and a final decision result is obtained by deciding that the value of the bit at each of the timings is the value opposite to the value of the immediately preceding bit.

It is to be noted that, at each of times $t_8$, $t_{12}$, $t_{16}$ and $t_{18}$ at which a sampling timing and a changing point do not coincide with each other (at which the transmission data does not exhibit a change between 1 and 0), a correct value is decided from the upper threshold value and the lower threshold value without referring to the immediately preceding bit.

As seen from the result of the decision of FIG. 8, the values "100101101001101010" of the bits at time $t_6$ et seq. following the synchronizing signal are same as the values of the bits which form the information signal of the transmission data.

Such decision of the values as described above is represented by the following expressions (1) and (2):

$$H \ldots \text{if } (x \geq 0.8) \text{ or } (0.2 < x < 0.8 \text{ and } A = L) \qquad (1)$$

$$L \ldots \text{if } (x \leq 0.8) \text{ or } (0.2 < x < 0.8 \text{ and } A = H) \qquad (2)$$

where x is the sample value, 0.8 the upper threshold value for the decision based on the sample value that the value is H (High=1), 0.2 the lower threshold value for the decision that the value is L (Low=0), and A the decision result of the value of the bit immediately preceding to the noticed bit.

It is to be noted that the upper and lower threshold values are preferably set depending upon the noise level of the system. For example, it is known from a simple experiment that, where the noise level of the system is ±20%, if the upper threshold value is set to 0.7 and the lower threshold value is set to 0.3, then the decision result is obtained stably.

Naturally, the particular values of the threshold values are not limited to such specific values as 0.7 and 0.3, and for a system which involves comparatively low noise, the threshold values may be set severely such that the upper threshold value is set to 0.9 and the lower threshold value is set to 0.1. This assures a higher degree of reliability of a value decided finally.

Where the threshold values are set severely, if unexpected noise enters, then a wrong decision occurs because data which originally can be decided is actually decided as an intermediate value. On the other hand, if the threshold values are set loosely such that the upper limit value is set to 0.6 and the lower limit value is set to 0.4 or the like, then a wrong decision is caused frequently by noise. Therefore, according to an experiment conducted till now, it is considered that it is appropriate to set the upper limit value within a range from 0.7 to 0.9 and set the lower limit value within another range from 0.1 to 0.3.

Figure 9:
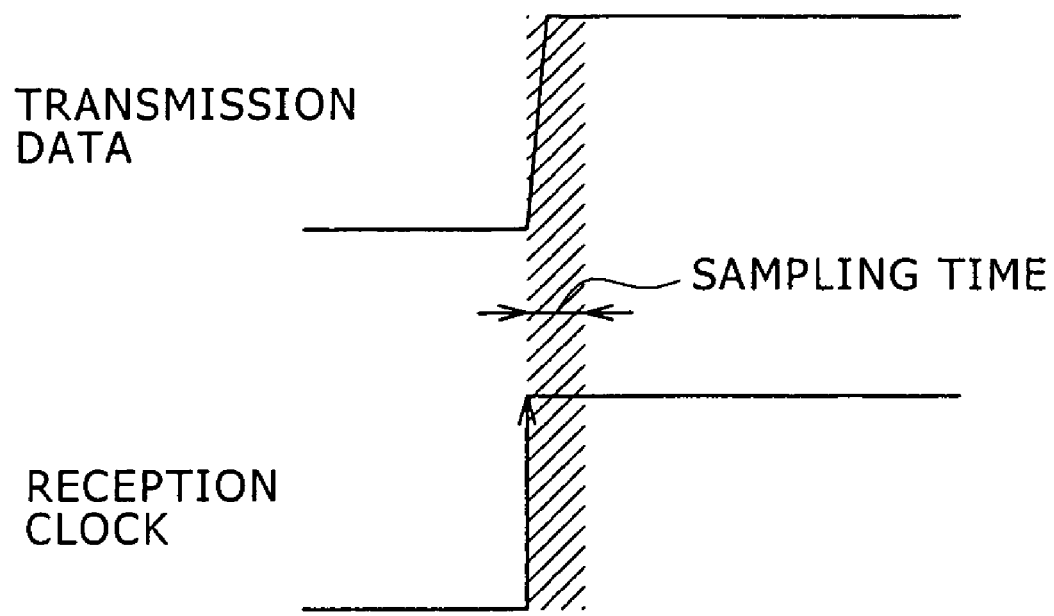
FIGS. 9, 10 and 11 are waveform diagrams illustrating further examples of waveforms of the communication system of FIG. 4 in an enlarged manner.
Figure 10:
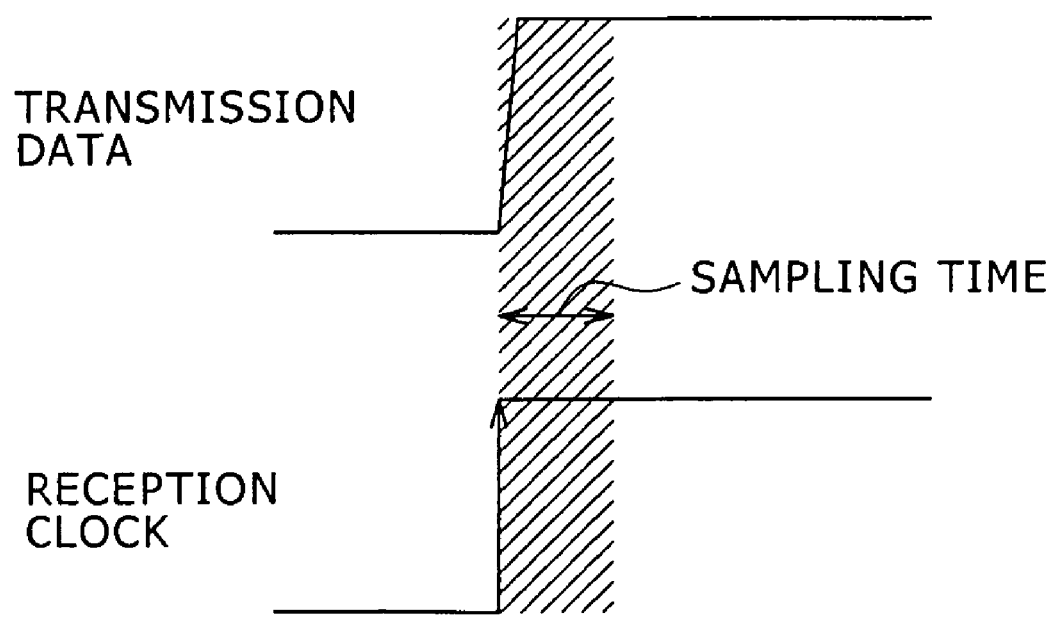
Figure 11:
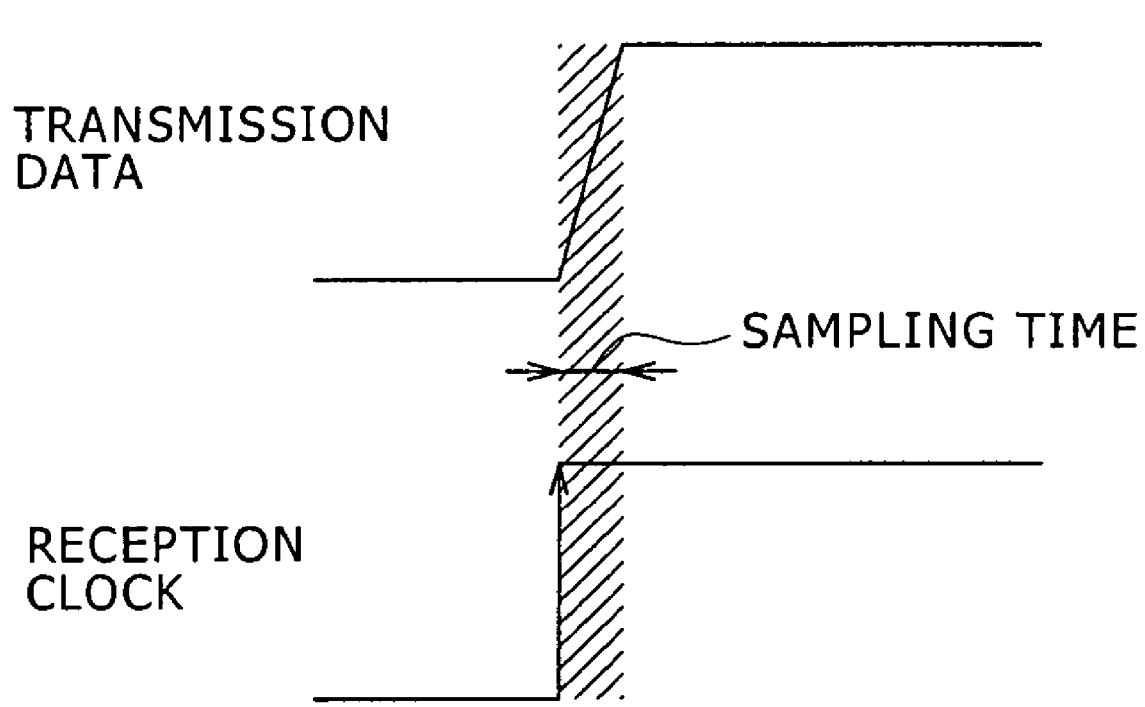

It is to be noted that, where a change of data is so sudden with respect to sampling time that it is difficult to assume an intermediate value even if a changing point and a sampling timing coincide with each other as seen from FIG. 9, a rather long period of time may be used as the sampling time as seen in FIG. 10 or a damping resistor may be interposed in a data line along which the transmission data passes on the sender side and the receiver side so that a change of the transmission data is moderated intentionally as seen in FIG. 11. By such countermeasures, the data can possibly assume an intermediate value readily and enhance the reliability of the decision result.

By adopting the communication method wherein such a decision of a value as described above is performed, transmission/reception of data can be performed while assuring a high transmission capacity. In other words, there is no necessity to set the estimated transmission capacity to a value lower than ½ from a restriction based on the sampling theory.

Further, since the apparatus on the sender side merely transmits data with a transmission clock of a frequency equal to that used on the apparatus of the receiver side, and also since the apparatus on the receiver side does not require such a configuration as a PLL either, both apparatus can be configured in a simplified configuration.

Further, since transmission and reception of data can be started without the necessity to take a period of time required for establishment of synchronism by a PLL into consideration, the time required to complete transmission of data of a certain fixed amount can be reduced.

A series of processes for transmission and reception of data including such a decision of a value as described above is hereinafter described with reference to a flow chart.

Figure 12:
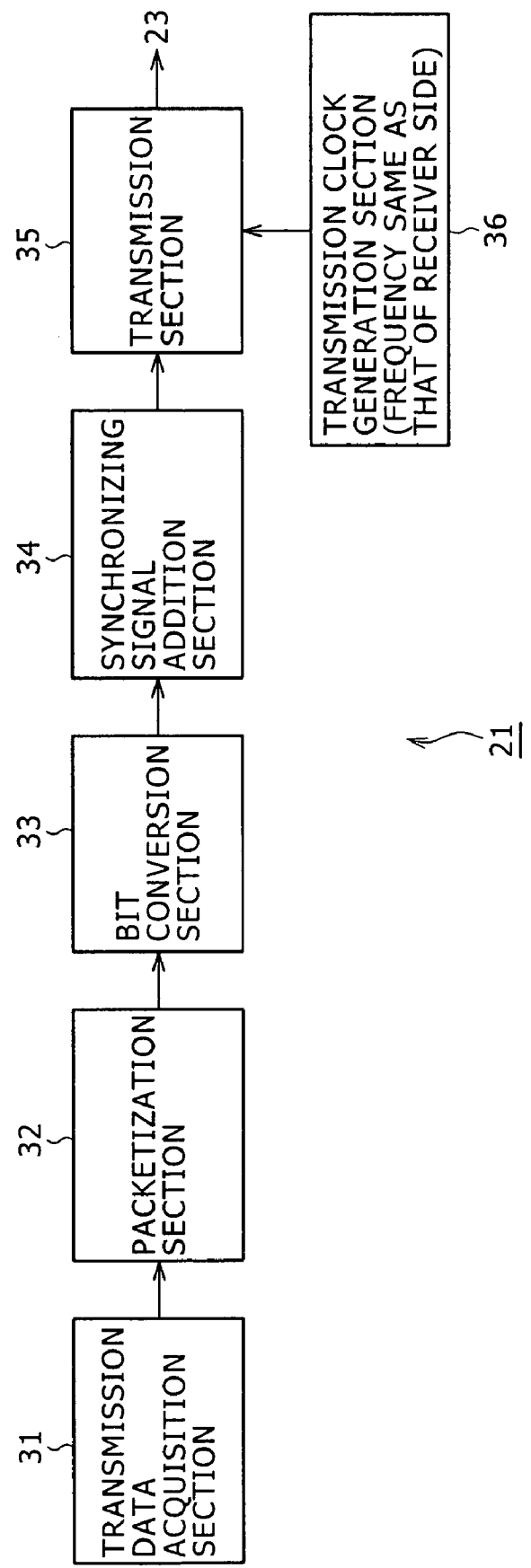
FIG. 12 is a block diagram showing an example of a configuration of a transmission apparatus shown in FIG. 4.

FIG. 12 shows an example of a configuration of the transmission apparatus 21.

Referring to FIG. 12, a transmission data acquisition section 31 acquires transmission data to be transmitted to the reception apparatus 22 and outputs the acquired transmission data to a packetization section 32. The transmission data acquired by the transmission data acquisition section 31 include various data such as audio data, video data and text data and construct data of the part of the information signal of FIG. 5.

The packetization section 32 divides the data supplied thereto from the transmission data acquisition section 31 into packets of a predetermined number of bytes and outputs the resulting packets to a bit conversion section 33.

The bit conversion section 33 performs bit conversion for the packets supplied thereto from the packetization section 32 in a unit of a packet and outputs data obtained by the bit conversion to a synchronizing signal addition section 34. The bit conversion performed by the bit conversion section 33 converts the data which are to form the information signal into data which do not include the pattern of 1 and 0 included in the synchronizing signal.

The synchronizing signal addition section 34 adds the synchronizing signal to the data obtained by the bit conversion by the bit conversion section 33 and outputs resulting data to a transmission section 35. The synchronizing signal is added in predetermined periods when the data to be transmitted are arranged time sequentially.

The transmission section 35 transmits the data supplied thereto from the synchronizing signal addition section 34 and having the synchronizing signal added thereto to the reception apparatus 22 through the data line 23 using a transmission clock supplied thereto from a transmission clock generation section 36.

The transmission clock generation section 36 is formed from, for example, a quartz oscillator and supplies a transmission clock generated thereby to the transmission section 35. The frequency of the transmission clock generated by the transmission clock generation section 36 is equal to that of the reception clock used in the reception apparatus 22.

Figure 13:
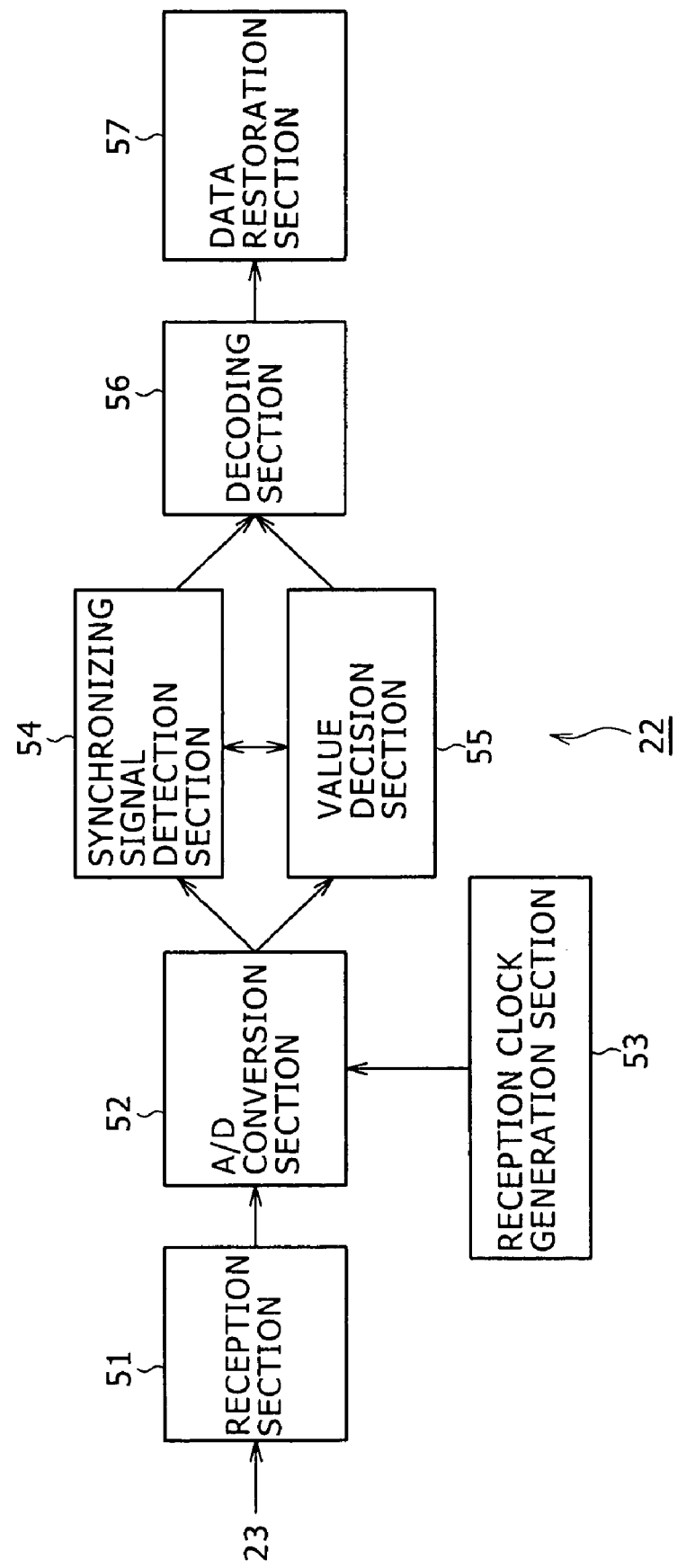
FIG. 13 is a block diagram showing an example of a configuration of a reception apparatus shown in FIG. 4.

FIG. 13 shows an example of a configuration of the reception apparatus 22.

Referring to FIG. 13, a reception section 51 receives data transmitted thereto from the transmission apparatus 21 through the data line 23 and outputs the received data (signal representative of the received data) to an analog/digital (A/D) conversion section 52.

The A/D conversion section 52 performs A/D conversion (sampling) of the signal supplied thereto from the reception section 51 in a period which depends upon a reception clock supplied thereto from a reception clock generation section 53, and outputs a resulting sample value to a synchronizing signal detection section 54 and a value decision section 55. The data outputted from the A/D conversion section 52 correspond, for example, to the reception data of FIG. 8 and each is one of 1, 0 and an intermediate value. In other words, the data obtained by the A/D conversion by the A/D conversion section 52 has a gradation and does not undergo a final decision between the values of 1 and 0 as yet.

The reception clock generation section 53 is formed from, for example, a quartz oscillator and supplies a reception clock generated to the A/D conversion section 52.

The synchronizing signal detection section 54 detects the synchronizing signal based on the data supplied thereto from the A/D conversion section 52 and a result of decision of the value between 1 and 0 by the value decision section 55. In particular, for example, when the synchronizing signal detection section 54 detects a predetermined number of successive bits of the value of 1, it outputs a signal representing this to the value decision section 55 so that the value decision section 55 may perform decision of the value of the following bit (if the value of this bit is 0, then in the example of the synchronizing signal described above, the bit of the value of 0 is the tail end bit of the synchronizing signal).

If the synchronizing signal detection section 54 decides based on the decision result of the value by the value decision section 55 that the value of the bit following the predetermined number of bits of the value of 1 is 0, then it recognizes that the bit is the tail end bit of the synchronizing signal and outputs a signal representing this to the value decision section 55 and a decoding section 56.

When the value of the data supplied from the A/D conversion section 52 is an intermediate value, the value decision section 55 decides the value opposite to the value of the immediately preceding bit as the value of the noticed bit and outputs the decision result to the synchronizing signal detection section 54 and the decoding section 56.

For example, if an intermediate value is received from the A/D conversion section 52 as a result of sampling performed at time $t_5$ of FIG. 8, then the value decision section 55 decides 0, which is the opposite value to the value of the immediately preceding bit, as the value of the noticed bit. Then, the value decision section 55 outputs the fact that a bit of 0 is detected as a decision result to the synchronizing signal detection section 54 and the decoding section 56. The synchronizing signal detection section 54 detects the tail end of the synchronizing signal based on the decision result.

On the other hand, if a signal representing that the tail end of the synchronizing signal is detected is received from the synchronizing signal detection section 54, then the value decision section 55 uses the settled value of the tail end bit for decision of the value of a bit following the synchronizing signal.

If a signal representing that the tail end of the synchronizing signal is detected is received from the synchronizing signal detection section 54, the decoding section 56 recognizes that any later decision result supplied thereto from the value decision section 55 is a bit which forms the information signal and performs reverse conversion to the bit conversion performed by the transmission apparatus 21 for the data supplied thereto from the value decision section 55. Data obtained by the reverse conversion is outputted to a data restoration section 57.

The data restoration section 57 restores the transmission data based on the signal supplied thereto from the decoding section 56. The data restored by the data restoration section 57 are used for outputting of sound or displaying of an image.

Now, operation of the transmission apparatus 21 and the reception apparatus 22 each having such a configuration as described hereinabove is described.

First, a transmission process of the transmission apparatus 21 is described with reference to a flow chart of FIG. 14.

First at step S1, the transmission data acquisition section 31 acquires transmission data to be transmitted to the reception apparatus 22 and outputs the acquired transmission data to the packetization section 32.

At step S2, the packetization section 32 divides the data supplied thereto from the transmission data acquisition section 31 into packets of a predetermined number of bytes and outputs the resulting packets to the bit conversion section 33.

At step S3, the bit conversion section 33 performs bit conversion of the packets supplied thereto from the packetization section 32 in a unit of a packet and outputs data obtained by the bit conversion to the synchronizing signal addition section 34.

At step S4, the synchronizing signal addition section 34 adds the synchronizing signal to the data obtained by the conversion process by the bit conversion section 33 and outputs the data with the synchronizing signal added thereto to the transmission section 35.

At step S5, the transmission section 35 transmits the data supplied thereto from the synchronizing signal addition section 34 and having the synchronizing signal added thereto to the reception apparatus 22 using a transmission clock supplied thereto from the transmission clock generation section 36. Thereafter, the processing returns to step S1 so that the transmission of the predetermined data from the transmission apparatus 21 to the reception apparatus 22 is performed repetitively.

Where a synchronizing signal is formed, for example, from five successive bits of the value 1 and one following bit of the value 0 (in the case of 5/1 sync different from that of the example described hereinabove with reference to FIG. 8) as a result of execution of the processing described above, the bit conversion section 33 performs 2-3 bit conversion so that the pattern "11110" included in the synchronizing signal may not appear in the bit string which forms the information signal (step S3). In particular, the bit conversion section 33 converts "00" into "100", "01" into "101", "10" into "010" and "11" into "011" as the 2-3 bit conversion.

Accordingly, where the data to be transmitted are, for example, "1234h=0001_0010_0011_0100b" (_does not form the data), the bit conversion section 33 performs 2-3 bit conversion of the data. Consequently, the values "100_101_100_010_100_011_101_100" are obtained as seen from a string of numerals indicated forwardly of a void arrow mark #1 in FIG. 15. In this manner, the bit string after the conversion does not include "11110" of the pattern which is included in the synchronizing signal".

Further, the synchronizing signal "111110" is added to the bit string obtained by the 2-3 bit conversion by the synchronizing signal addition section 34 (step S4). Thus, the bit string to be transmitted to the reception apparatus 22 at step S5 is "111110_100_101_100_010_100_011_101_100" as seen from a string of numerals indicated forwardly of a void arrow mark #2 in FIG. 15.

It is to be noted that the method of pattern conversion or bit conversion of 1 and 0 of the synchronizing signal is not limited to that illustrated in FIG. 15, and synchronizing signals and bit conversions of various patterns are applicable and various data formats are available.

In particular, it is possible to determine a format depending upon a combination of a synchronizing signal and a bit conversion, for example, 1. 6/1 sync, 3-4 bit conversion
2. 4/4 sync, biphase (DE Free)
3. 9/1 sync, RLL(1, 7)
4. 9/9 sync, RLL(1, 7)+DSV (DC Free)
5. 2/5/2 sync, 2-3 bit conversion Also the frequency in which the synchronizing signal is inserted is determined in the following manner depending upon the environment.

For example, where the accuracy of reference clocks used in the transmission apparatus 21 and the reception apparatus 22 is reliable (where the error is small), the distance over which the synchronizing signal should be inserted can be increased where the accuracy is not reliable. This can raise the coding efficiency by an amount corresponding to data which form the synchronizing signal.

On the other hand, where the frequency accuracy of the reference clock is approximately ±100 ppm like quartz, once the phases of the transmission clock and the reception clock are placed into coincidence with each other using the synchronizing signal, this condition is kept for a little while. In this instance, the period in which the synchronizing signal is to be inserted is determined depending upon the format or the noise environment rather than the accuracy.

On the other hand, if the reference clock suffers from an error within ±1% including a temperature deviation like a ceramic oscillator, then even if the phases are successfully brought into coincidence with each other once by the synchronizing signal, the phase difference between the transmission clock and the reception clock thereafter varies gradually. Accordingly, in this instance, since there is the possibility that bit displacement may occur in communication of 50 bits or more, the synchronizing signal is inserted in a period shorter than 50 bits.

Now, a reception process of the reception apparatus 22 is described with reference to the flow chart of FIG. 16.

It is assumed here that, in the following description given with reference to FIG. 16, the synchronizing signal is formed from four successive bits of the value of 1 and one following bit of the value of 0 (4/1 sync) as seen in FIG. 8. Further, 2-3 bit conversion is performed by the transmission apparatus 21 so that "1110" included in the synchronizing signal may not appear in the information signal.

At step S11, the A/D conversion section 52 performs sampling of a signal supplied thereto from the reception section 51 in a period which depends upon the reception clock supplied thereto from the reception clock generation section 53 and outputs a resulting sample value to the synchronizing signal detection section 54 and the value decision section 55.

At step S12, the synchronizing signal detection section 54 decides whether or not more than three successive bits of the value of 1 are received from the A/D conversion section 52. If it is decided that more than three successive bits of the value of 1 are not received, then the processing advances to step S13. For this decision, the upper and lower threshold values set in the synchronizing signal detection section 54 are used. The upper and lower threshold values are set also in the value decision section 55.

At step S13, the synchronizing signal detection section 54 decides whether or not the synchronizing signal is received already. If it is decided that the synchronizing signal is not received as yet, then the processing returns to step S1 to repeat the processes at the steps beginning with step S1. This decision is performed based on setting of a flag representative of a reception situation of the synchronizing signal.

On the other hand, if the synchronizing signal detection section 54 decides at step S12 that more than three successive bits of the value of 1 are received from the A/D conversion section 52, then the processing advances to step S14.

At step S14, the synchronizing signal detection section 54 outputs a signal representing that the synchronizing signal is being received to the value decision section 55 so that the value decision section 55 may perform decision of the value of the next bit.

At step S15, the A/D conversion section 52 performs sampling of the next bit and outputs a resulting sample value to the value decision section 55.

At step S16, the value decision section 55 performs decision of the value of the noticed bit based on the sample value received from the A/D conversion section 52.

For example, if the sample value received from the A/D conversion section 52 assumes an intermediate value, then the value decision section 55 decides, based on the fact that the value of the immediately preceding bit is 1, that the value of the noticed bit is 0, and outputs a decision result representing this to the synchronizing signal detection section 54. Further, where the value of the noticed bit is 1 based on the sample value received from the A/D conversion section 52, the value decision section 55 outputs a decision result representing this to the synchronizing signal detection section 54.

At step S17, the synchronizing signal detection section 54 decides whether or not the decision result received from the value decision section 55 represents the value of 0. If the synchronizing signal detection section 54 decides that the decision result does not represent 0, that is, the noticed bit is not the tail end bit of the synchronizing signal, then the processing returns to step S15 so that the processes at the steps beginning with step S15 are repeated. In other words, the noticed bit is changed to the next bit, and sampling and decision of the value are performed again.

On the other hand, if the synchronizing signal detection section 54 decides at step S17 that the decision result received from the value decision section 55 represents the value of 0, that is, the noticed bit is the tail end bit of the information signal, then the processing advances to step S18. At step S18, the synchronizing signal detection section 54 outputs a signal representing that the synchronizing signal is completed to the value decision section 55 and the decoding section 56. Consequently, the value decision section 55 settles the value of one bit and uses the value for decision of the value with regard to the later bits.

Further, at step S19, the synchronizing signal detection section 54 sets a flag representing that the synchronizing signal is received already, and then the processing advances to step S20. Also when it is decided at step S13 that the synchronizing signal is received already, the processing advances to step S20 similarly.

At step S20, the decoding section 56 performs decoding (in the present case, 3-2 conversion which is reverse conversion of the 2-3 conversion) for every 3 bits following the synchronizing signal, and outputs resulting data to the data restoration section 57. In other words, decision of the value is performed successively by the value decision section 55, and data of such decision results are supplied to the decoding section 56.

At step S21, the data restoration section 57 temporarily stores the data successively supplied thereto from the decoding section 56 into a buffer to restore a set of data and outputs the restored data to the outside. When data are transmitted from the transmission apparatus 21 again, the processing returns to step S11 so that similar processes to those described hereinabove are repeated.

By the process described above, communication can be implemented even where means for synchronizing the reception clock with the transmission clock is not provided in the reception apparatus 22.

It is to be noted that, while, in the process described above, the value obtained by the A/D conversion section 52 is one of three gradations of 1, 0 and an intermediate value, the value may be one of a greater number of gradations.

Figure 17:
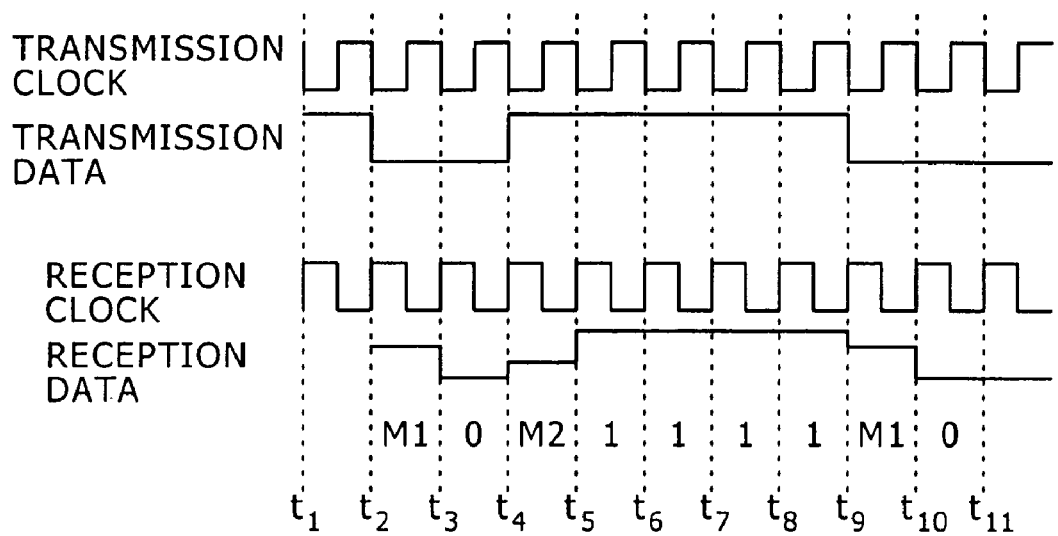
FIG. 17 is a waveform diagram illustrating an example of waveforms upon detection of a synchronizing signal.

FIG. 17 illustrates detection of a synchronizing signal using four gradations.

Referring to FIG. 17, it is assumed that, in the example illustrated, 2/5/2 sync (synchronizing signal formed from two successive bits of the value of 0, five successive bits of the value of 1 and two successive bits of the value of 0) and 2-3 bit conversion described hereinabove are used as an example of determination of a format. In particular, the transmission data within the period from time $t_2$ to time $t_{11}$ is the synchronizing signal. In this instance, the bit conversion is performed for the information signal so that more than four successive bits of the value of 1 may not appear in the information signal.

Further, the value of the noticed bit where the value of the immediately preceding bit is 1 and the value of the immediately following bit is 0 is represented by an intermediate value M1, and the value of the noticed bit where the value of the immediately preceding bit is 0 and the value of the immediately following bit is 1 is represented by another intermediate value M2.

In this instance, where a value successively appears, a number of values smaller by one than the number of successive values can be detected correctly by the reception apparatus 22. Therefore, from among the five bits of the value of 1 which successively appear within the period of time $t_4$ to time $t_9$ of the synchronizing signal, the four bits of the value of 1 which appear within the period from time $t_5$ to time $t_9$ are detected, and consequently, the synchronizing signal is specified by the reception apparatus 22.

Further, from two successive bits of the value of 0 which appear before and after the five successive bits of the value of 1, the value of 0 is detected correctly by sampling individually at times $t_3$ and $t_{10}$.

Since time $t_4$ coincides with a changing point of the transmission data, an intermediate value is detected by sampling performed at this point of time. The intermediate value is the intermediate value M2 from the value 0 of the immediately preceding bit and the value 1 of the immediately following bit.

Further, since time $t_9$ coincides with a changing point of the transmission data, an intermediate value is detected by sampling performed at this point of time. The value of the noticed bit of the intermediate value is determined as the intermediate value M1 from the value 1 of the immediately preceding bit and the value 0 of the immediately following bit.

Where four gradations are used and it is determined that, when the bit string of the values of "0, M2, 1, 1, 1, 1, M1, 0" is detected, the synchronizing signal is detected in this manner, the accuracy in detection of the synchronizing signal can be enhanced when compared with that of the case wherein three gradations are used as described above.

In the communication system of FIG. 4, since it is significant to cause the reception apparatus 22 to settle the value of one bit using the synchronizing signal, by raising the accuracy in detection of the synchronizing signal by such a manner as described above, also the accuracy in decision of the values of the following bits can be raised.

Such a communication method described hereinabove can be applied to various systems.

Figure 18:
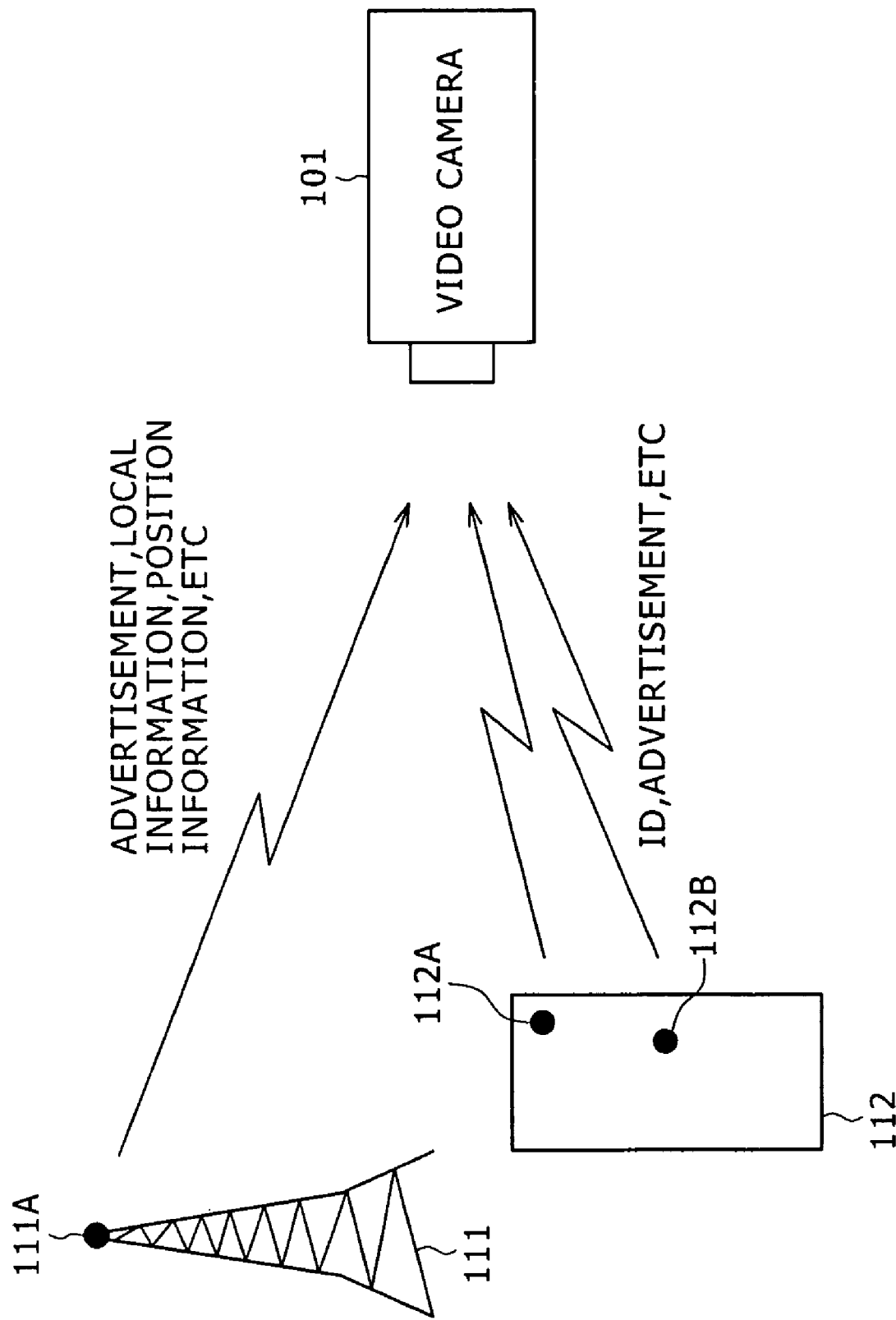
FIG. 18 is a block diagram showing an example of a configuration of another communication system to which the present invention is applied.

FIG. 18 shows an example of a configuration of another communication system to which the present invention is applied.

In the communication system of FIG. 18, the apparatus of the receiver side which corresponds to the reception apparatus 22 shown in FIG. 4 is a video camera 101. Naturally, a portable telephone set or the like having an image pickup function may be used in place of the video camera 101.

Further, the apparatus of the sender side which corresponds to the transmission apparatus 21 shown in FIG. 4 is, for example, a light emitting apparatus 111A installed in an ad pillar 111 positioned away from the position of the video camera 101 or a pair of light emitting apparatus 112A and 112B installed at predetermined positions of an outer wall of an office building 112.

The light emitting apparatus 111A and the light emitting apparatus 112A and 112B transmit predetermined data such as an ID, an advertisement, local information or position information using the light as a medium, and the transmitted data is received by the video camera 101. In particular, the light emitting apparatus 111A and the light emitting apparatus 112A and 112B include a light emitting element, and light emitted from the light emitting element is received by the image pickup device such as a CCD (Charge Coupled Device) unit or a CMOS (Complementary Metal Oxide Semiconductor) unit of the video camera 101. The video camera 101 restores the data from the received light.

In this manner, also in the case of a communication system which uses light as a medium, the light emitting frequency of a light emission pattern representative of data transmitted from the light emitting apparatus 111A and light emitting apparatus 112A and 112B is equal to the sampling frequency of the image pickup device of the video camera 101 which is the apparatus of the receiver side. For example, where the video camera 101 is a video camera of the NTSC (National Television System Committee) system wherein image pickup is performed at 59.94 field/sec, the light emission frequency of the light emission pattern is approximately 60 Hz.

Figure 19:
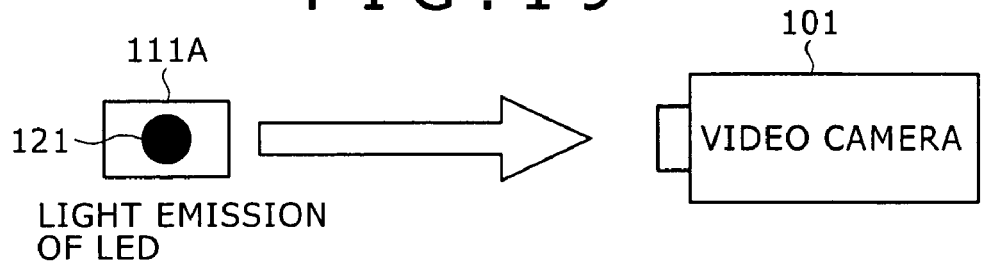
FIG. 19 is a view showing a light emitting apparatus and a video camera shown in FIG. 18.

Here, restoration of transmission data of the video camera 101 performed based on light emitted from the light emitting apparatus 111A as seen in FIG. 19 is described. It is to be noted that also the light emitting apparatus 112A and 112B operate similarly to the light emitting apparatus 111A.

Data to be transmitted from the light emitting apparatus 111A are formed from bits each of which represents 1 or 0 which is represented by a light emission pattern of a light emission section 121 which may be formed from a light emitting diode (LED) or the like. For example, the value 1 is represented by light emission ON and the value 0 is represented by light emission OFF.

Figure 20:
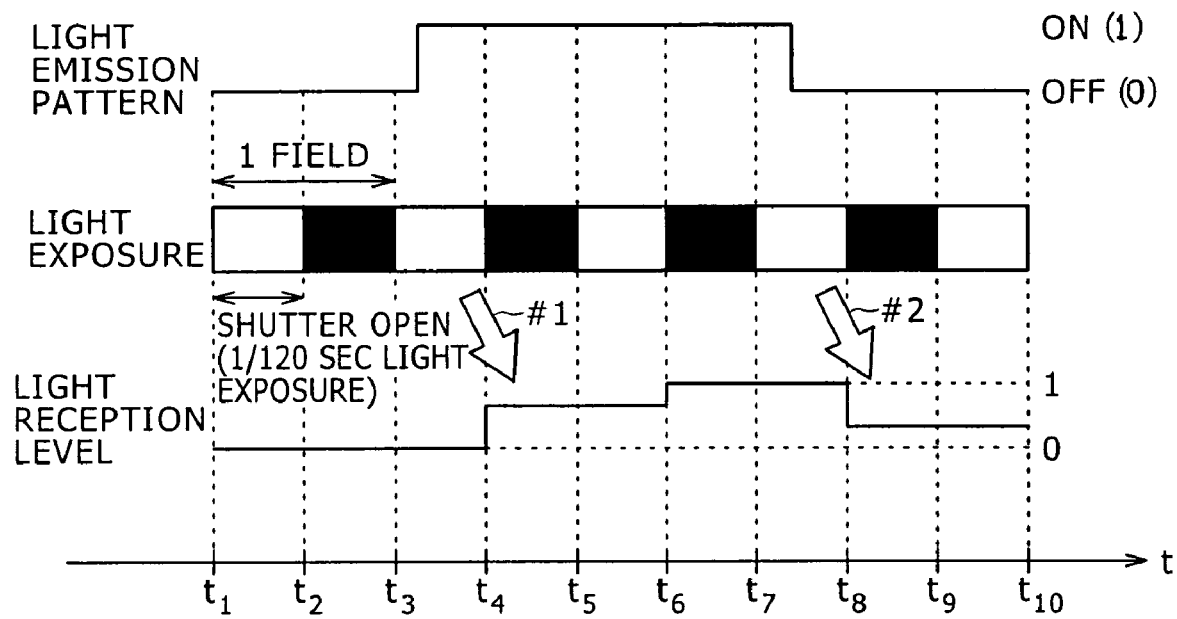
FIG. 20 is a view illustrating an example of a light emitting pattern, exposure time and a received light level.

FIG. 20 illustrates, from above, a light emission pattern of the light emission section 121, exposure time of the video camera 101 and a reception level detected by the exposure.

The video camera 101 does not perform sampling instantaneously like the reception apparatus 22 of FIG. 4 (strictly, time is required for sampling although it is very short as described hereinabove), but performs sampling (light exposure) in exposure time set within a period of one field and suitable for the environment. Then, the video camera 101 decides the values within a period of one field based on the resulting received light levels.

Where the exposure time (shutter speed) is $1/120$ second as seen in FIG. 20, light exposure is performed only for a period of time equal to one half the period of one field, and the shutter is kept closed for the remaining period of time. In FIG. 20, those periods represented by the blank within a period of one field are periods within which light exposure is performed, and those periods represented by the dark are periods within which the shutter remains closed.

If the value of the transmission data changes while the light exposure is not performed, that is, when the light emission pattern changes from ON to OFF or from OFF to ON in response to a change of data, since the ON/OFF periods of one time of light emission of the light emission section 121 and the period of one field of the video camera 101 coincide with each other, the video camera 101 can correctly decide all of the values within each one field.

For example, if it is assumed that the received light level when light from the light emission section 121 continues to be received for one period of light exposure time is represented by 1 and the received light level where no light is received is represented by 0, then since the light emission pattern within a period from time $t_1$ to time $t_3$ of FIG. 20 is OFF, the received light level by the light exposure then is very close to the zero level (emitted light level which appears within a period from time $t_2$ to time $t_4$). The video camera 101 can decide the value of the transmission data within the period from time $t_1$ to time $t_3$ based on the received light level.

On the other hand, within another period from time $t_5$ to time $t_7$, since the emitted light pattern is ON, the received light level by the exposure in this instance is very close to 1 (received light level appearing within a period from time $t_6$ to time $t_8$). The video camera 101 can decide the value of the transmission data within the period from time $t_5$ to time $t_7$ as 1 based on the received light level.

On the other hand, if the value of the transmission data changes during light exposure, then a different received light level is detected depending upon the timing of the change of the value. Accordingly, in this instance, the video camera 101 cannot decide the value of the transmission data only from the received light level. Since the period of ON/OFF of one cycle of light emission of the light emission section 121 and the period of one field of the video camera 101 coincide with each other, the state described above appears repetitively at every timing of light exposure.

It is to be noted that changing of the value of the transmission data during light exposure corresponds such coincidence of a sampling timing and a changing point of data as described above. Also in this instance, since an intermediate value is obtained as a sample value, it is impossible to decide the value of the noticed bit only from the sample value.

In the example of FIG. 20, the emitted light pattern changes from OFF to ON during the light exposure from time $t_3$ to time $t_4$. Further, the emitted light pattern changes from ON to OFF during the light exposure from time $t_7$ to time $t_8$.

For example, if the change from OFF to ON from between the two changes of the emitted light pattern occurs at a point of time after lapse of $1/3$ ($1/360$ second) the exposure time in one cycle of light exposure after time $t_3$, then the received light level obtained by the light exposure after time $t_3$ till time $t_4$ is represented by $2/3$ as represented as received light level within a period from time $t_4$ to time $t_6$ as indicated forwardly of a void arrow mark #1 in FIG. 20. This received light level of $2/3$ corresponds to a period of time within which the exposure time from time $t_3$ to time $t_4$ and the period of time within which the light emission pattern is ON overlap with each other.

Further, for example, if the change from ON to OFF occurs at a point of time after lapse of $1/3$ the exposure time in one cycle of light exposure after time $t_7$, then the received light level obtained by the light exposure after time $t_7$ till time $t_8$ is represented by $1/3$ as represented as received light level within a period from time $t_8$ to time $t_{10}$ as indicated forwardly of a void arrow mark #2 in FIG. 20. This received light level of $1/3$ corresponds to a period of time within which the exposure time from time $t_7$ to time $t_8$ and the period of time within which the light emission pattern is ON overlap with each other.

When an intermediate level like this received light level $2/3$ or $1/3$ is obtained, the video camera 101 cannot decide the value only from the received light level. In this instance, since that an intermediate level is detected represents that the light emission pattern changes during the light exposure, the video camera 101 decides the value opposite to the immediately preceding value as a value within the period to be detected by the light exposure.

It is to be noted that the patterns for light emission by the light emitting apparatus 111A include a pattern representative of a synchronizing signal for causing the video camera 101 to settle one value within a period of one field. Also light emission patterns representative of the synchronizing signal include a pattern which does not appear in the information signal following the synchronizing signal at all.

Accordingly, after the synchronizing signal is detected, the video camera 101 can decide the values within each one field following the synchronizing signal by referring to the immediately preceding value as occasion demands.

Where the ON/OFF period of light emission of one cycle of the light emission section 121 and the period of one field of the video camera 101 coincide with each other in this manner, when no change occurs with the light emission pattern during the light exposure, the video camera 101 can correctly decide the values within the period of one noticed field only from the received light level. On the other hand, if a change occurs with the light emission pattern during the light exposure, then the video camera 101 can decide the values within the period of one noticed field from the received light level which is an intermediate level and the values within the immediately preceding period of one field.

Figure 21:
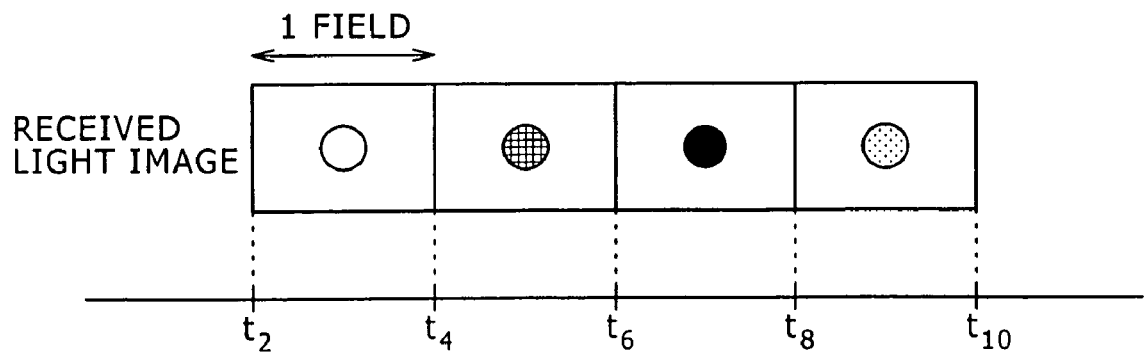
FIG. 21 is a view illustrating the received light level as a density.

FIG. 21 illustrates the received light levels within periods of different fields of FIG. 20 in density.

As seen from FIG. 21, a received light level of substantially 0 is detected within a period of one field from time $t_2$ to time $t_4$, and another received light level of approximately ⅔ is detected within a period of one field from time $t_4$ to time $t_6$. Further, a further received light level of substantially 1 is detected within a period of one field from time $t_6$ to time $t_8$, and a still further received light level of approximately ⅓ is detected within a period of one field from time $t_8$ to time $t_{10}$.

According to the communication method which uses such decision of a value as described above, since it is possible to perform communication (transmission/emission of light) without establishing synchronism between the apparatus between which communication is to be performed, in case the light receiving area of light emitted by one of the apparatus is sufficiently small when compared with the area of the image pickup device, data can be transmitted at a time from a plurality of light sources (light emitting apparatus) which are not in synchronism with each other to the single video camera 101.

Figure 22:
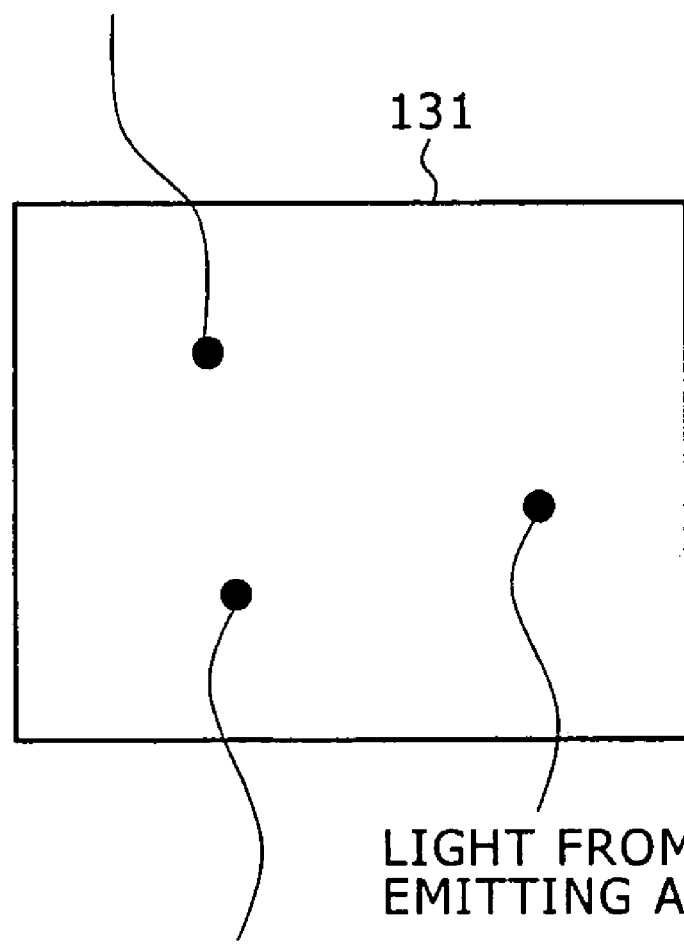
FIG. 22 is a view showing an example of a light receiving position.

FIG. 22 shows an example of light receiving positions of the video camera 101 in the configuration shown in FIG. 18.

Referring to FIG. 22, light from the light emitting apparatus 111A, light from the light emitting apparatus 112A and light from the light emitting apparatus 112B are received at different positions of an image pickup device 131 provided in the video camera 101, and data transmitted from the individual apparatus is acquired based on the received light levels at the individual positions.

Also it is possible to transmit data at a time from one light source to a plurality of cameras.

Figure 23:
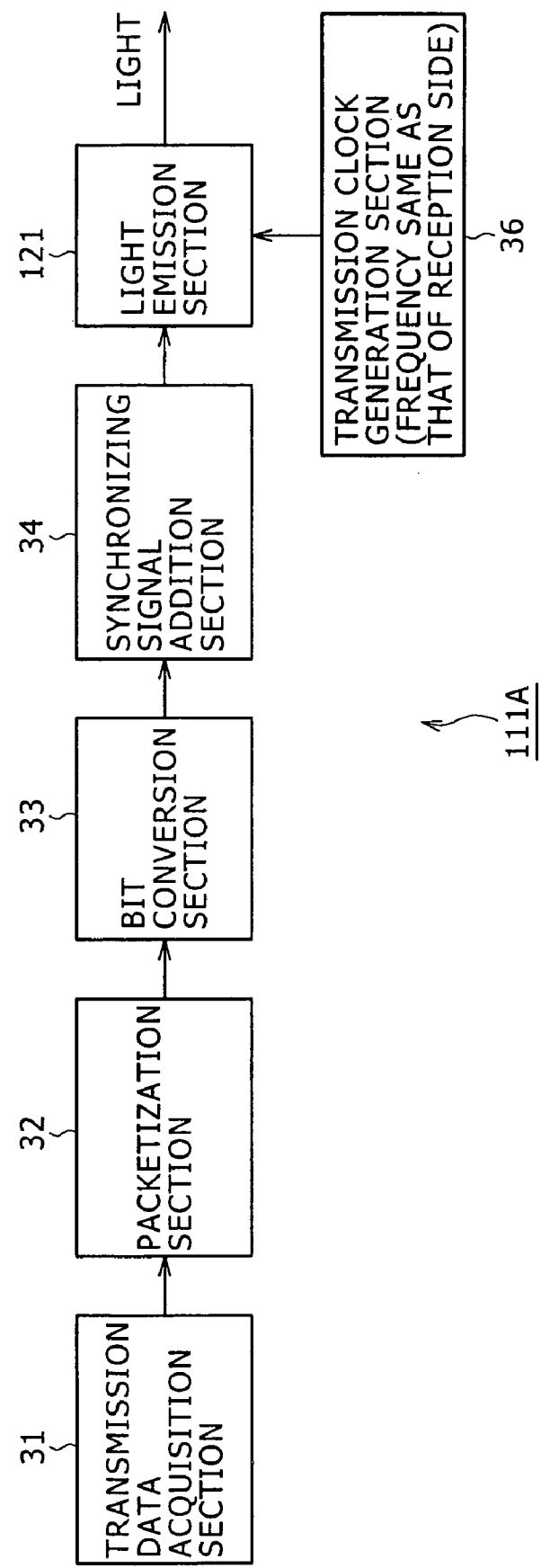
FIG. 23 is a block diagram showing an example of a configuration of a light emitting apparatus shown in FIG. 18.

FIG. 23 shows an example of a configuration of the light emitting apparatus 111A.

The light emitting apparatus 111A has a configuration basically similar to that of the transmission apparatus 21 of FIG. 12. In particular, the light emitting apparatus 111A includes a transmission data acquisition section 31, a packetization section 32, a bit conversion section 33, a synchronizing signal addition section 34 and a transmission clock generation section 36 similar to those of FIG. 12. Description of such common components as just mentioned is omitted herein to avoid redundancy.

The light emitting apparatus 111A further includes a light emission section 121 which may be formed from an LED. The light emission section 121 changes over ON/OFF of light emission in accordance with a clock supplied thereto from the transmission clock generation section 36 to emit light of a pattern representative of data to which the synchronizing signal is added by the synchronizing signal addition section 34.

Figure 24:
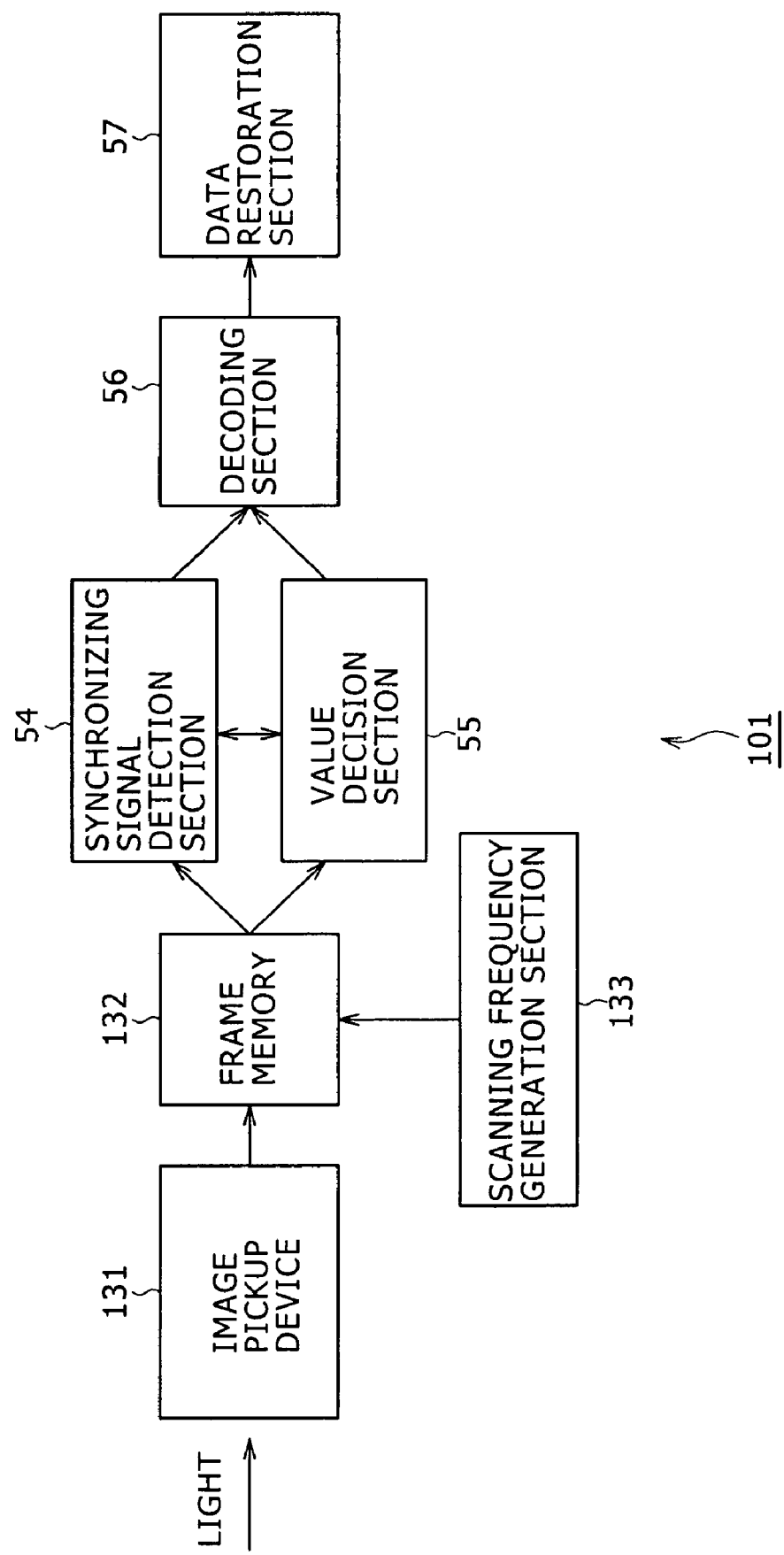
FIG. 24 is a block diagram showing an example of a configuration of a video camera shown in FIG. 18.

FIG. 24 shows an example of a configuration of the video camera 101.

The video camera 101 has a configuration basically similar to that of the reception apparatus 22 of FIG. 13. In particular, the video camera 101 includes a synchronizing signal detection section 54, a value decision section 55, a decoding section 56 and a data restoration section 57 similar to those of FIG. 13. Description of such common components as just mentioned is omitted herein to avoid redundancy.

The video camera 101 further includes an image pickup device 131, a frame memory 132 and a scanning frequency generation section 133 in place of the reception section 51, A/D conversion section 52 and reception clock generation section 53 shown in FIG. 13. The image pickup device 131 may be formed from a CCD unit or a CMOS unit and outputs a signal corresponding to the received light level to the frame memory 132.

The frame memory 132 scans (samples) the signal transmitted thereto from the image pickup device 131 in accordance with a scanning frequency supplied thereto from the scanning frequency generation section 133 and outputs a signal representative of the received light level to the synchronizing signal detection section 54 and the value decision section 55.

Similarly to the synchronizing signal detection section 54 of the reception apparatus 22, the synchronizing signal detection section 54 of the video camera 101 detects the synchronizing signal from a pattern (light emission pattern) of the received light level which does not appear within the information signal.

Further, if the received light level is higher than the upper threshold value based on the signal supplied from the frame memory 132, the value decision section 55 decides that the value within the noticed period is 1. However, if the received light level is lower than the lower threshold value, then the value decision section 55 decides that the value within the noticed period is 0. If the received light level is lower than the first threshold value but higher than the lower threshold value, then the value decision section 55 decides that the value within the noticed period is the value opposite to the value within the immediately preceding period.

Figure 14:
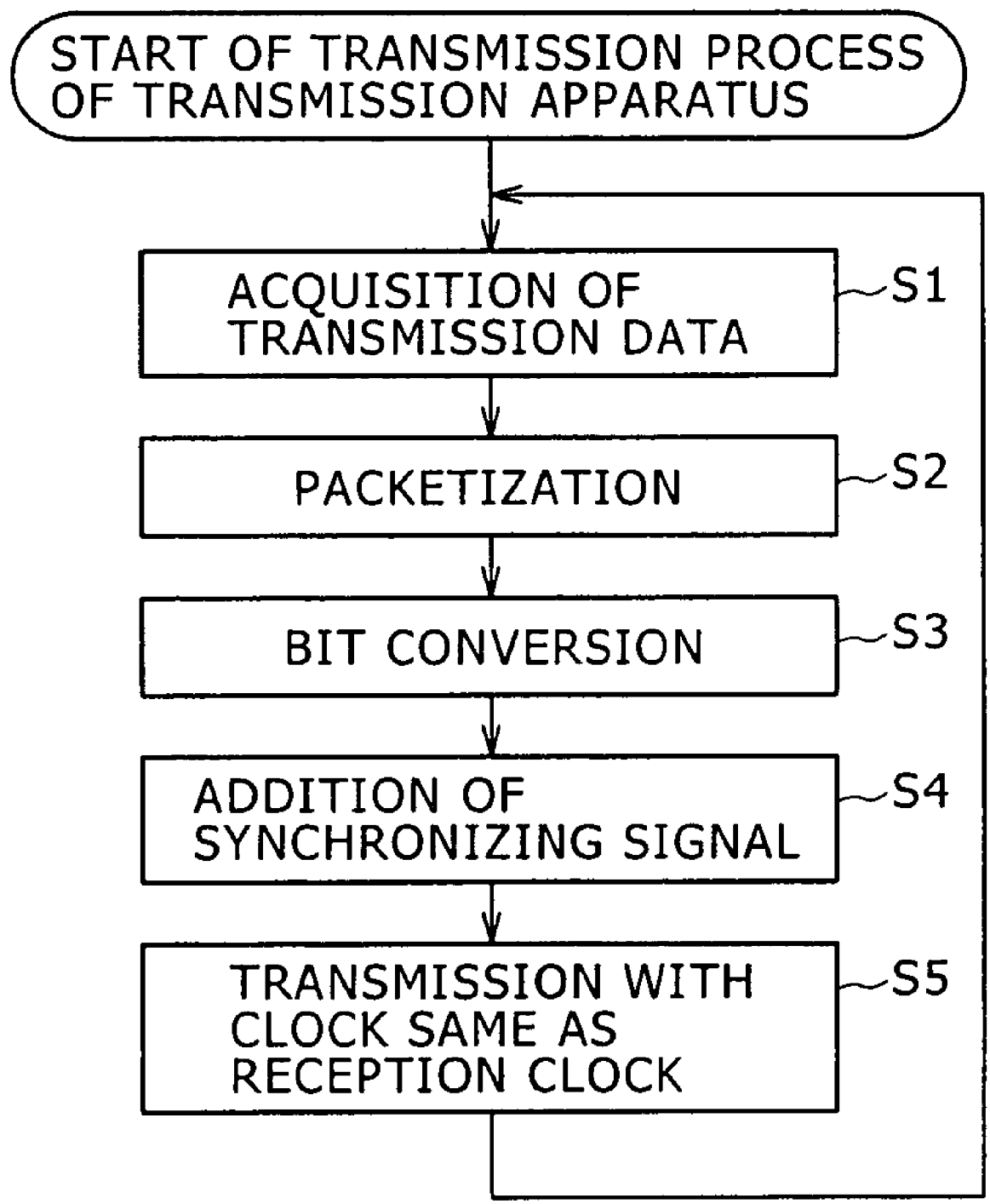
FIG. 14 is a flow chart illustrating a transmission process of the transmission apparatus of FIG. 12.
Figure 16:
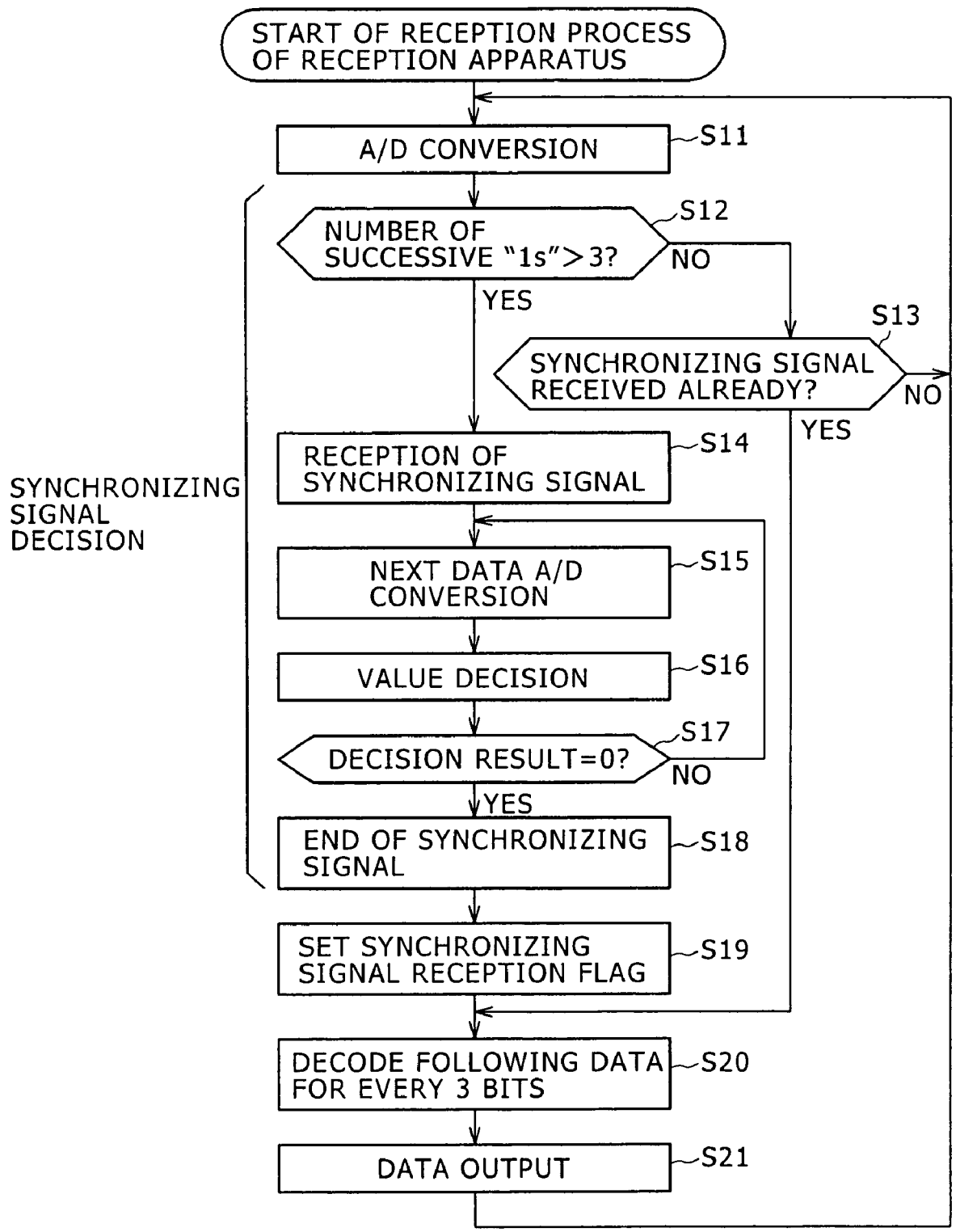
FIG. 16 is a flow chart illustrating a reception process of the reception apparatus of FIG. 13.

The light emitting apparatus 111A having the configuration shown in FIG. 23 performs a process similar to that illustrated in FIG. 14, and the video camera 101 having the configuration shown in FIG. 24 performs a process similar to that of FIG. 16. Consequently, asynchronous communication wherein the light is used as a medium is performed between the light emitting apparatus 111A and the video camera 101.

While the foregoing description relates to the case wherein the apparatus which restores data transmitted thereto based on the level of received light is the video camera 101, such asynchronous communication wherein light is used as a medium as described above can be performed by any apparatus only if the apparatus can detect light in a predetermined period.

Figure 25:
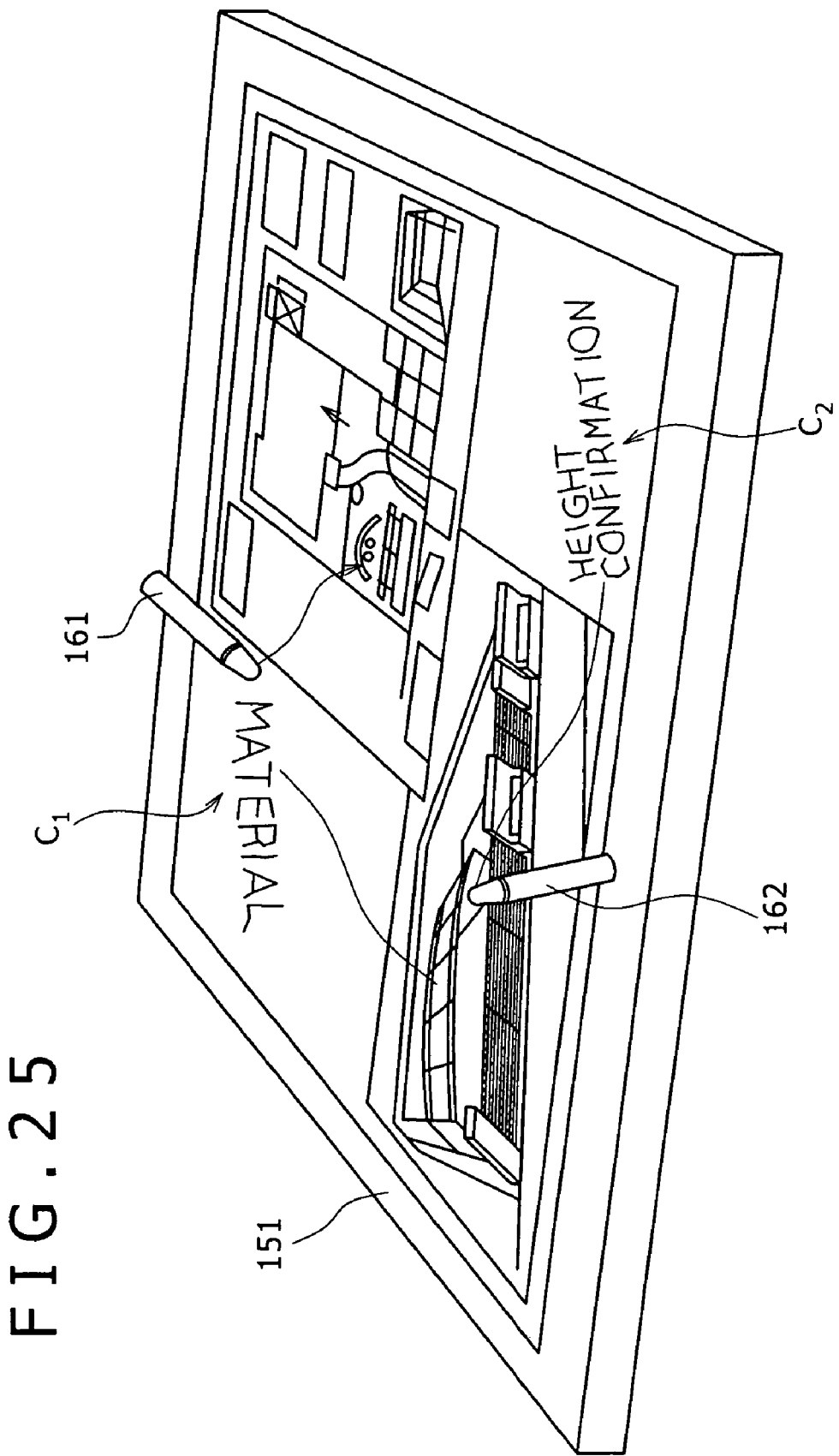
FIG. 25 is a block diagram showing an example of a configuration of a further communication system to which the present invention is applied.

FIG. 25 shows an example of a configuration of a further communication system to which the present invention is applied.

An I/O display unit 151 is a display unit which can implement an IN function (light receiving operation) of detecting light illuminated from the outside and an OUT function (displaying operation) of displaying a predetermined image using pixels which form the I/O display unit 151.

Each of the pixels which form the I/O display unit 151 may be formed using, for example, a TFT (Thin Film Transistor) and an organic or inorganic EL (Electroluminescence) element. In other words, the I/O display unit 151 is an EL display unit of the self-luminous type which allows self matrix driving.

In the I/O display unit 151, operation of the pixels is controlled such that a predetermined number of lines of pixels for performing light receiving operation and a predetermined number of lines of pixels for performing displaying operation are set separately from each other within one frame. Operation of the individual lines is suitably changed over for every one frame so that it looks to the user that displaying and light reception are performed simultaneously by the pixels which form the I/O display unit 151.

Any of the pixels which perform light receiving operation receives light from an LED provided at a tip end of each of LED pens 161 and 162 utilized by the user. Restoration of data outputted from the LED pens 161 and 162 is performed based on the received light levels of light received by the pixels which perform light receiving operation, and an image corresponding to the restored data is displayed by the pixels which perform displaying operation.

For example, if the user illuminates light emitted from the LED pen 161 upon a predetermined position of the I/O display unit 151, then a line of red is displayed along the locus of the illuminated position. On the other hand, if the user illuminates light emitted from the LED pen 162 upon another predetermined position of the I/O display unit 151, then another light of blue is displayed along the locus of the illuminated position.

Information inputted from each of the LED pens 161 and 162 to the I/O display unit 151 (that is, data represented by a light emission pattern) includes identification information representing that the pen is used to input a red or blue line or the like.

It is to be noted that a hand-written character $C_1$ ("material") displayed on the I/O display unit 151 of FIG. 25 and a hand-written line led from the character $C_1$ are displayed in red. Further, another hand-written character $C_2$ ("height confirmation") and a hand-written line led from the character $C_2$ are displayed in blue.

Figure 26:
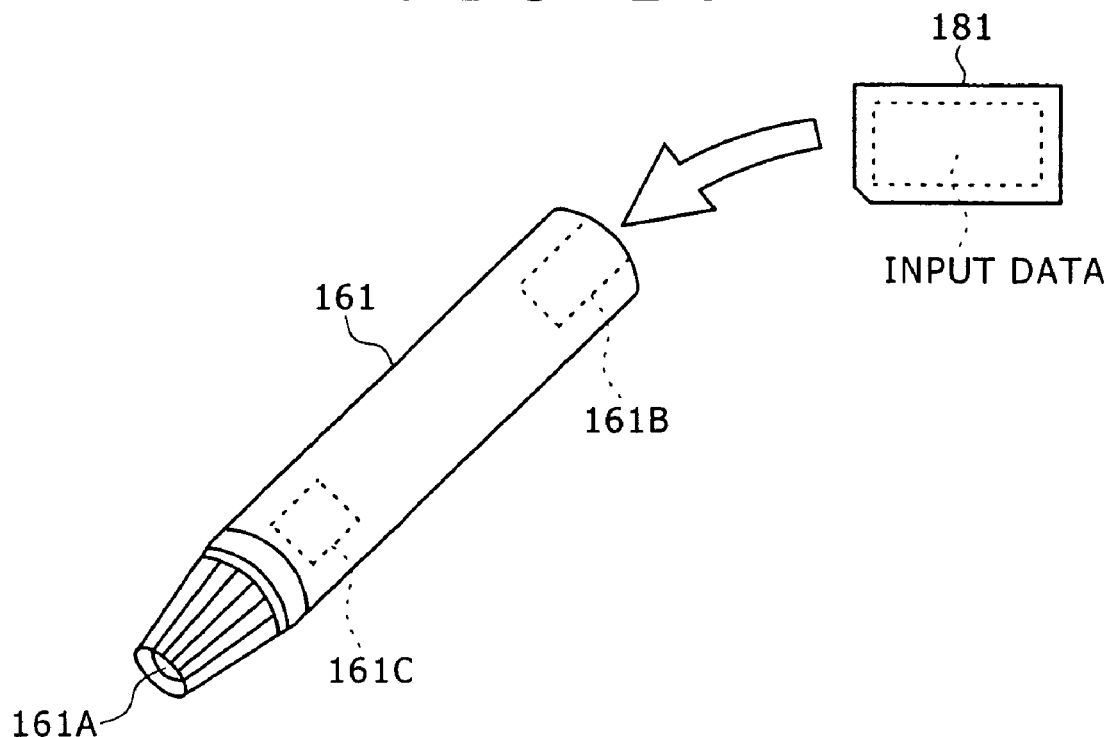
FIGS. 26 and 27 are schematic views showing different examples of an appearance of an LED pen.

FIG. 26 shows an example of an appearance of the LED pen 161.

The LED pen 161 has an LED 161A provided at an end thereof and has a slot 161B provided at the other end thereof such that a memory card 181 can be removably inserted.

The user can use, for example, a personal computer not shown to store predetermined data into the memory card 181 and mount the memory card 181 on the LED pen 161 so that the LED pen 161 emits light in a pattern corresponding to the predetermined data stored in the memory card 181.

An information processing section 161C of the LED pen 161 has a configuration similar to that of the light emitting apparatus 111A shown in FIG. 23. The LED pen 161 performs such processes for data stored in the memory card 181 as packetization, bit conversion, addition of the synchronizing signal and so forth, and the LED 161A emits light in a pattern representing the data obtained by the processes by the information processing section 161C. The light emission frequency of the LED 161A is equal to the sampling frequency (rate of one field or one frame) of the I/O display unit 151.

Figure 27:
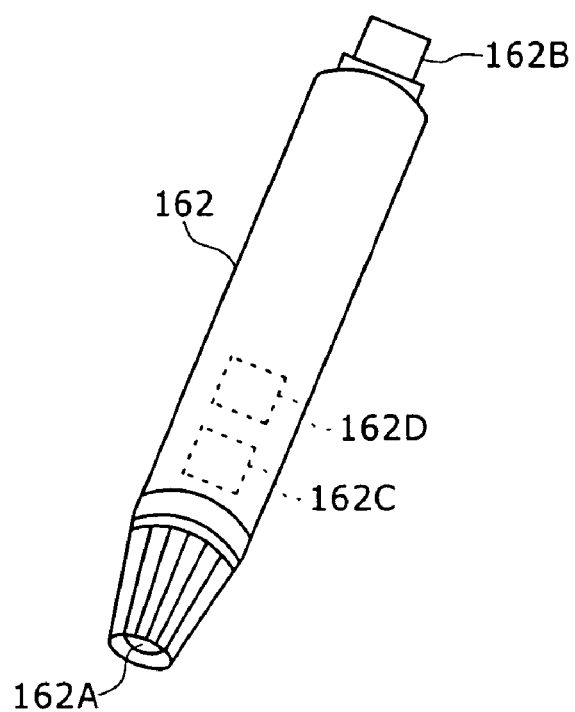

FIG. 27 shows an example of an appearance of the LED pen 162.

The LED pen 162 has an LED 162A attached to an end thereof and has a connector 162B provided at the other end thereof such that it allows the LED pen 161 itself to be mounted directly on a USB (Universal Serial Bus) port of a personal computer.

The user can mount the connector 162B, for example, into a USB port of a personal computer not shown and store predetermined data from the personal computer into a flash memory 162D built in the LED pen 162. Consequently, the user can cause the LED pen 162 to emit light in a pattern corresponding to the predetermined data stored in the flash memory 162D. Thus, the predetermined data can be inputted to the I/O display unit 151 by receiving the light emitted from the LED pen 162.

Also an information processing section 162C of the LED pen 162 has a configuration similar to that of the light emitting apparatus 111A shown in FIG. 23. The information processing section 162C performs such processes for data stored in the flash memory 162D as packetization, bit conversion, addition of the synchronizing signal and so forth, and the LED 162A emits light in a pattern representing the data obtained by the processes by the information processing section 162C. Also the light emission frequency of the LED 162A is equal to the sampling frequency of the I/O display unit 151.

Naturally, such a connector 162B and a built-in connector 162B as shown in FIG. 27 may be provided in the LED pen 161 and such a slot 161B as shown in FIG. 26 may be provided on the LED pen 162 conversely. Further, a configuration for making it possible for the user to select identification information of individual colors inputted to the I/O display unit 151 may be provided so that characters of a plurality of different colors or the like can be inputted using a single pen.

Where a pen or pens which can input characters of different colors or the like are prepared in this manner, the user can input characters or lines of various colors to the I/O display unit 151 in a sense similar to that when the user writes characters on paper changing a pen for a different color.

Further, if the light emission frequency of the LED pen and the sampling frequency of the I/O display unit 151 are equal to each other, then the LED pen and the I/O display unit 151 need not be in synchronism and, on the I/O display unit 151, an input can be detected by each pixel. Consequently, a plurality of users can use LED pens to input information at a time as described hereinabove with reference to FIG. 22.

Here, the IN function and the OUT function of the I/O display unit 151 are described.

Figure 28:
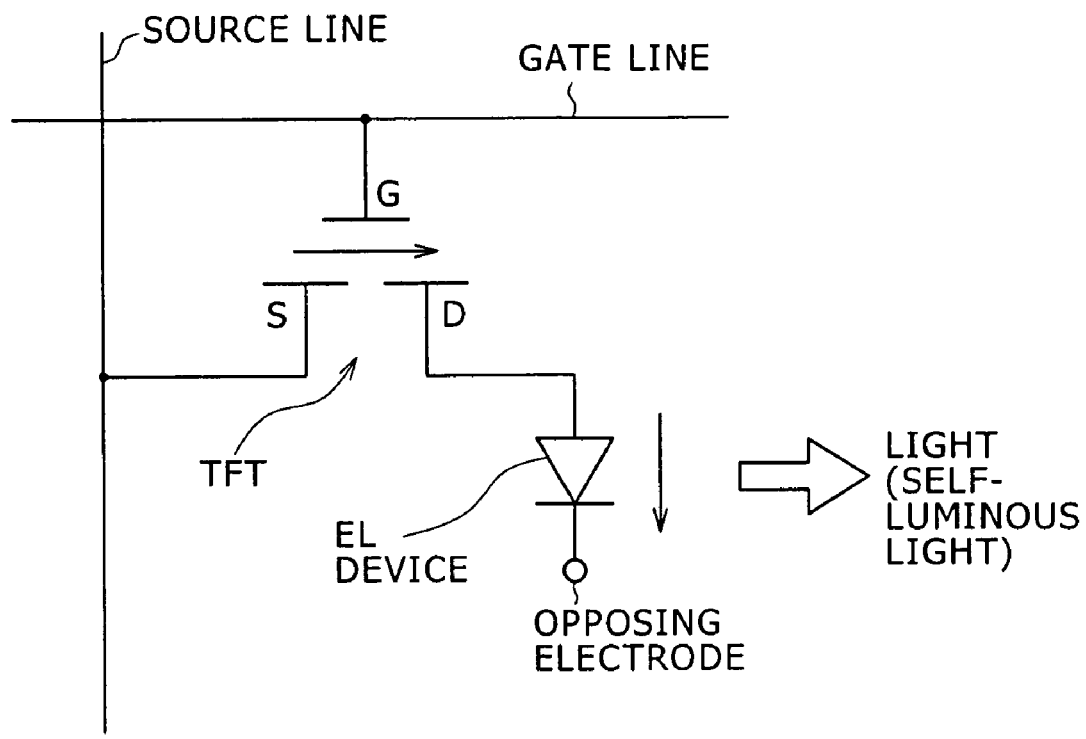
FIGS. 28 and 29 are circuit diagrams showing different examples of a circuit of one pixel of an I/O display unit.
Figure 29:
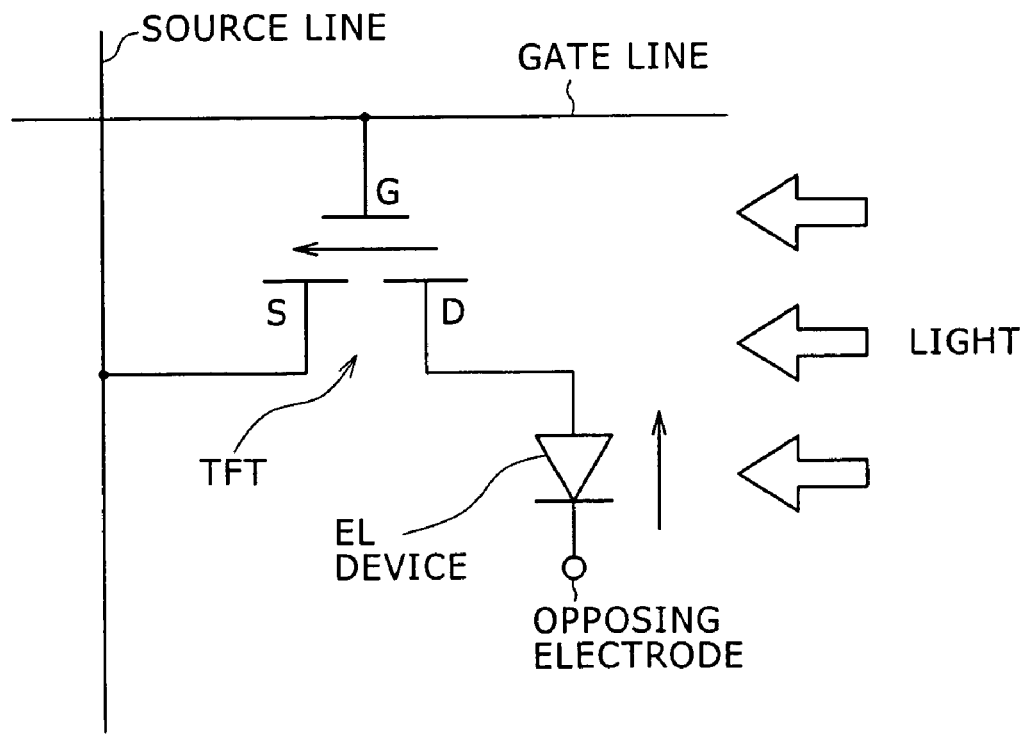

FIGS. 28 and 29 show a circuit of one pixel of the I/O display unit 151.

When a voltage (bias) in the forward direction is applied to the gate electrode G of a TFT through a gate line, current flows from the source electrode S toward the drain electrode D within an active semiconductor layer (channel) made of amorphous silicon or polycrystalline silicon as indicated by an arrow mark of a solid line of FIG. 28 through a source line in response to the voltage applied to the source electrode S.

The anode electrode of an EL element is connected to the drain electrode D of the TFT, and the EL element emits light as indicated by a void arrow mark in FIG. 28 in response to a potential difference between the anode and cathode electrodes which is generated by the current flowing through the channel of the TFT.

The light from the EL element is emitted to the outside of the display unit. Accordingly, displaying of the pixel, that is, the OUT function, is implemented by such operation of the pixel as described above.

On the other hand, where a voltage in the proximity of 0 V or in the reverse direction is applied to the gate electrode G of the TFT through the gate line, even when a voltage is applied to the source electrode S through the source line, current does not flow in the channel, and no potential difference appears between the anode and cathode electrodes of the EL element. Consequently, no light is emitted from the EL element.

If, in this state, light from the outside is illuminated on the pixel of FIG. 29 as indicated by a void arrow mark, then leak current (off current) flows from the drain electrode D toward the source electrode S by the photoconductivity of the channel of the TFT although the current amount is very small. Similarly, leak current is generated also in the EL element.

From this, if the leak current generated by a pixel (TFT, EL element) to which a voltage in the proximity of 0 V or in the reverse direction is applied is amplified to detect whether or not such leak current exists, then it can be identified whether or not light is illuminated on the pixel from the outside. Further, also the amount of light can be identified depending upon the amount of leak current. In other words, the IN function is implemented by the operation.

Figure 30:
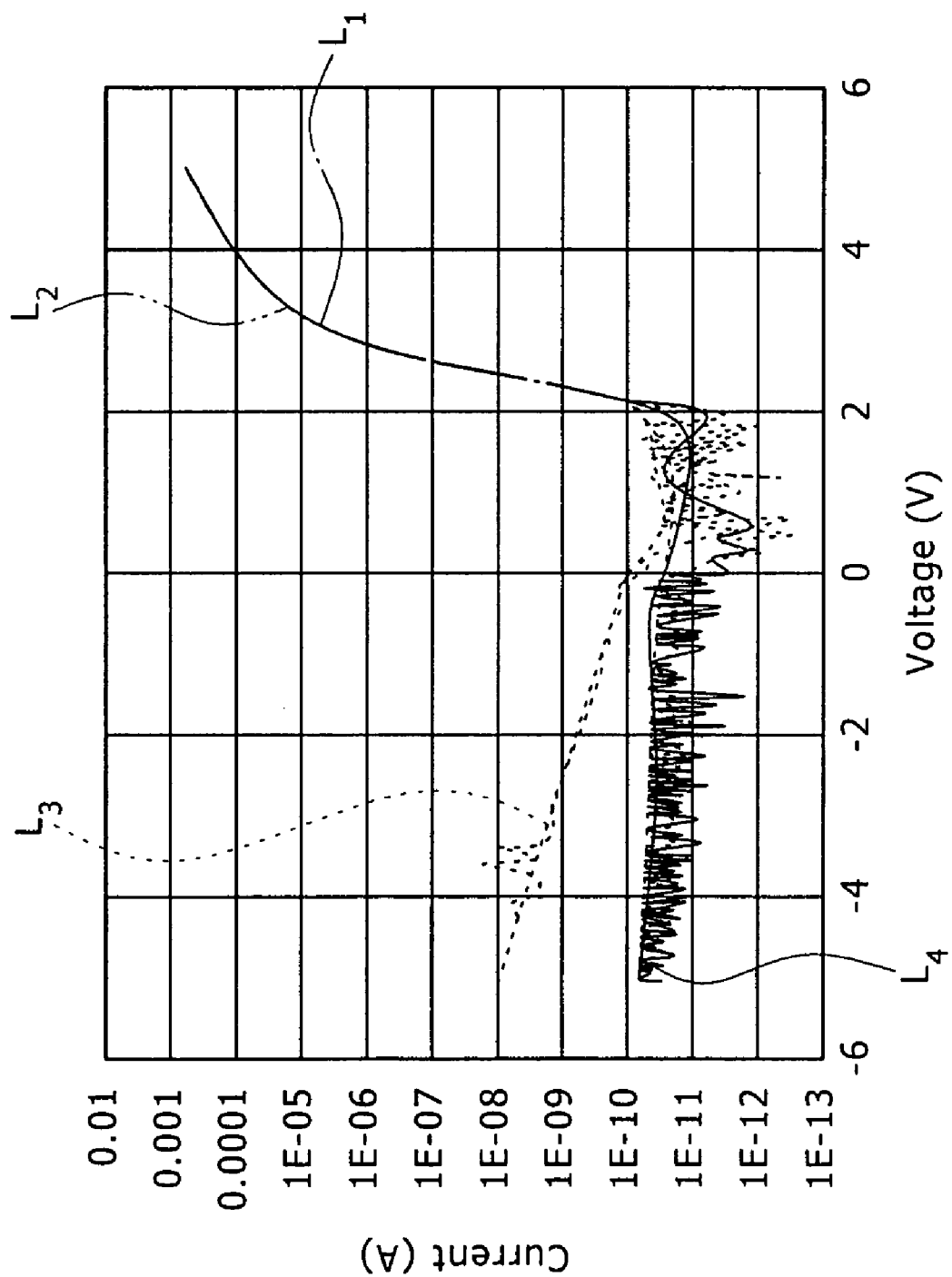
FIG. 30 is a diagram illustrating current characteristics of pixels shown in FIGS. 28 and 29.

FIG. 30 illustrates a current characteristic of the pixel shown in FIGS. 28 and 29. In FIG. 30, the axis of ordinate represents the current in the pixel, and the axis of abscissa represents the voltage applied to the gate electrode G.

A line $L_1$ representative of a result of a measurement represents the value of current (current flowing through the channel of the TFT and current flowing through the EL element) detected by the pixel when light is illuminated on the pixel while a voltage in the forward direction is applied. Another line $L_2$ represents the value of current detected by the pixel when light is not illuminated on the pixel while a voltage in the forward direction is applied.

From the lines $L_1$ and $L_2$, it can be recognized that, when a voltage in the forward direction is applied, the current values detected exhibit no difference irrespective of whether or not light from the outside exists.

On the other hand, a further line $L_3$ in FIG. 30 represents the value of current detected by the pixel when light is illuminated on the pixel from the outside while a voltage in the reverse direction is applied. A still further line $L_4$ represents the value of current detected by the pixel when light is not illuminated on the pixel from the outside while a voltage in the reverse direction is applied.

As can be recognized from comparison between the lines $L_3$ and $L_4$, where a voltage in the proximity of 0 V or in the reverse direction is applied, a difference is found between current values detected at the pixel depending upon whether or not light is illuminated on the pixel from the outside. For example, if light of a predetermined amount is illuminated upon the pixel from the outside while a voltage of approximately −5 V (voltage in the reverse direction) is applied, then current (current generated in the active semiconductor layer of the TFT and current generated by the EL element) of approximately "1 E-8 (A)" is generated.

In FIG. 30, it is indicated that, even when light is not illuminated from the outside, very low current of approximately "1E-10 (A)" is generated. However, this originates from noise during the measurement. It is to be noted that, of whichever one of the colors of R, G and B the pixel of the EL element emits light, an experiment result substantially similar to that illustrated in FIG. 30 is obtained.

As described above, the I/O display unit 151 which includes a TFT and an EL element provided in each pixel can not only display an image but also detect light from the outside using the pixels by applying a voltage in the proximity of 0 V or in the reverse direction. It is to be noted that the I/O display unit described above is disclosed in detail in Japanese Patent Application No. 2003-281480 filed by the assignee of the present application.

Figure 31:
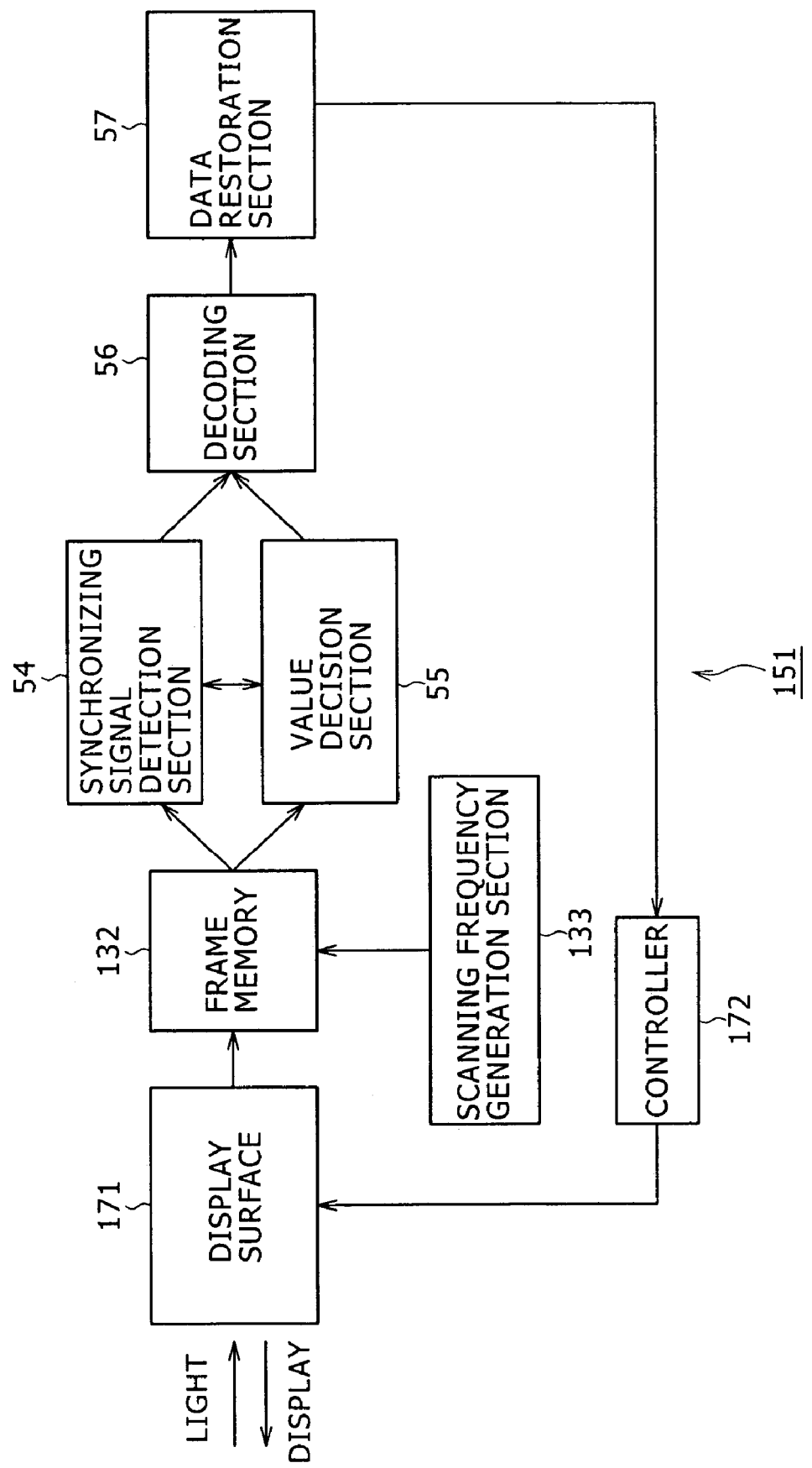
FIG. 31 is a block diagram showing an example of a configuration of the I/O display unit shown in FIG. 25.

FIG. 31 is a block diagram showing an example of a configuration of the I/O display unit 151.

Referring to FIG. 31, the I/O display unit 151 has a basic configuration similar to that of the video camera 101 of FIG. 24. In particular, the I/O display unit 151 includes a frame memory 132, a scanning frequency generation section 133, a synchronizing signal detection section 54, a value decision section 55, a decoding section 56, and a data restoration section 57. The I/O display unit 151 further includes a display surface 171 in place of the image pickup device 131 of the video camera 101 of FIG. 24. The I/O display unit 151 additionally includes a controller 172.

The display surface 171 includes a plurality of pixels each including a TFT and an EL element. Operation of the individual pixels is controlled in a unit of a line by the controller 172. Displaying of an image is performed by those pixels of the lines by which light emitting operation is to be performed from among the pixels which form the display surface 171, and light illuminated from the LED pen 161 or the like is received by any of those pixels of the lines by which light receiving operation is to be performed. For example, a signal obtained by amplifying current generated in response to received light is outputted from any pixel to the frame memory 132.

If the level of light received by a pixel during light receiving operation assumes an intermediate value with which it is impossible to decide, for example, which one of the levels of 1 and 0 the light level has, then the value decision section 55 refers to the value within the immediately preceding period as described hereinabove with reference to FIG. 20 to decide the value within the noticed period. The decoding section 56 performs reverse conversion to the bit conversion performed by the LED pen 161 or the like for a result of such decision performed by the value decision section 55 as described above. Then, the data is restored by the data restoration section 57.

For example, if the identification information of the LED pen 161 is restored by the data restoration section 57 and it is confirmed that the pen from which light is currently illuminated at a predetermined position of the display surface 171 is a red pen, then the information representing this is supplied from the data restoration section 57 to the controller 172. Consequently, a line, a character or the like of red is displayed along a locus on the display surface 171 along which light is illuminated by those pixels which perform displaying operation from among the pixels which form the display surface 171.

The controller 172 controls light receiving operation or displaying operation of the pixels which form the display surface 171.

A process similar to the process illustrated in FIG. 14 is executed by the information processing section 161C of the LED pen 161 having the configuration shown in FIG. 23, and a process similar to the process illustrated in FIG. 16 is performed by the I/O display unit 151 having the configuration shown in FIG. 31. Consequently, asynchronous communication wherein light is used as a medium is performed between the LED pen 161 and the I/O display unit 151.

Figure 32:
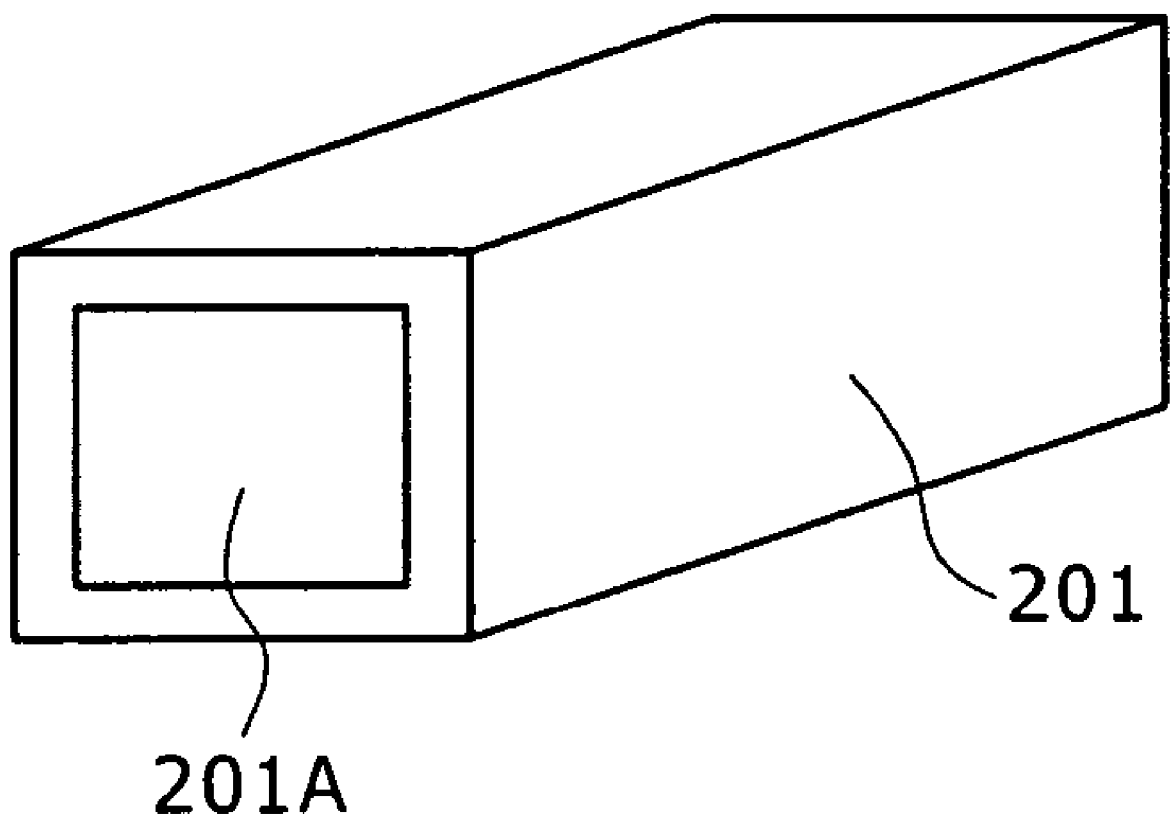
FIG. 32 is a schematic perspective view showing an example of a light emitting apparatus.

While, in the foregoing description, communication is performed through ON/OFF of a light emitting element, communication may otherwise be performed, for example, by such a light emitting apparatus 201 as shown in FIG. 32 wherein light is emitted from an overall light emitting surface 201A.

Figure 33:
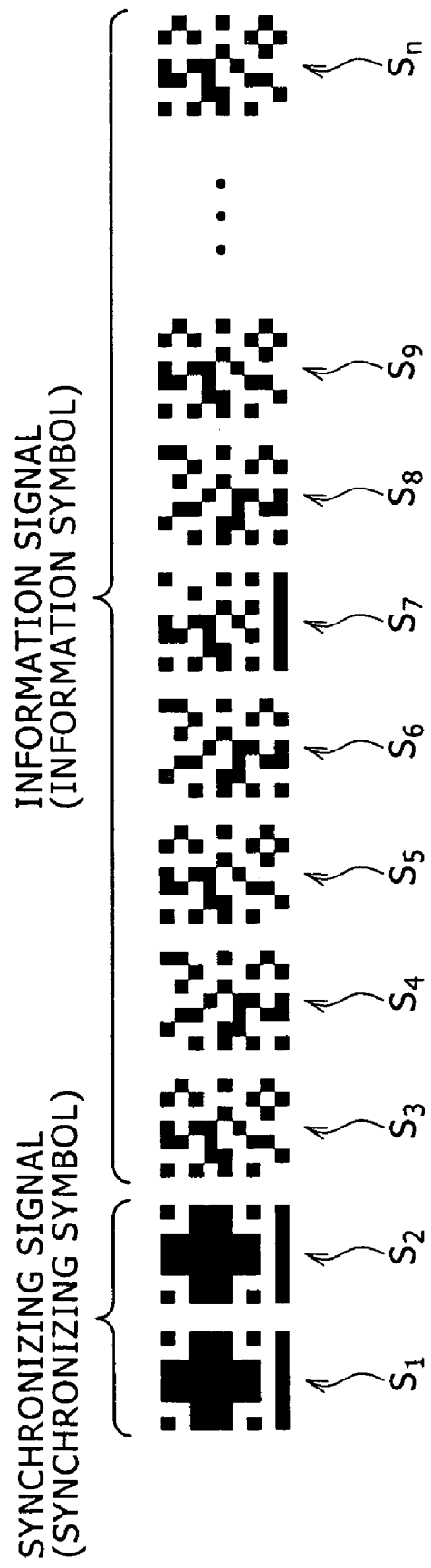
FIG. 33 is a schematic view showing an example of a two-dimensional bar code.
Figure 34:
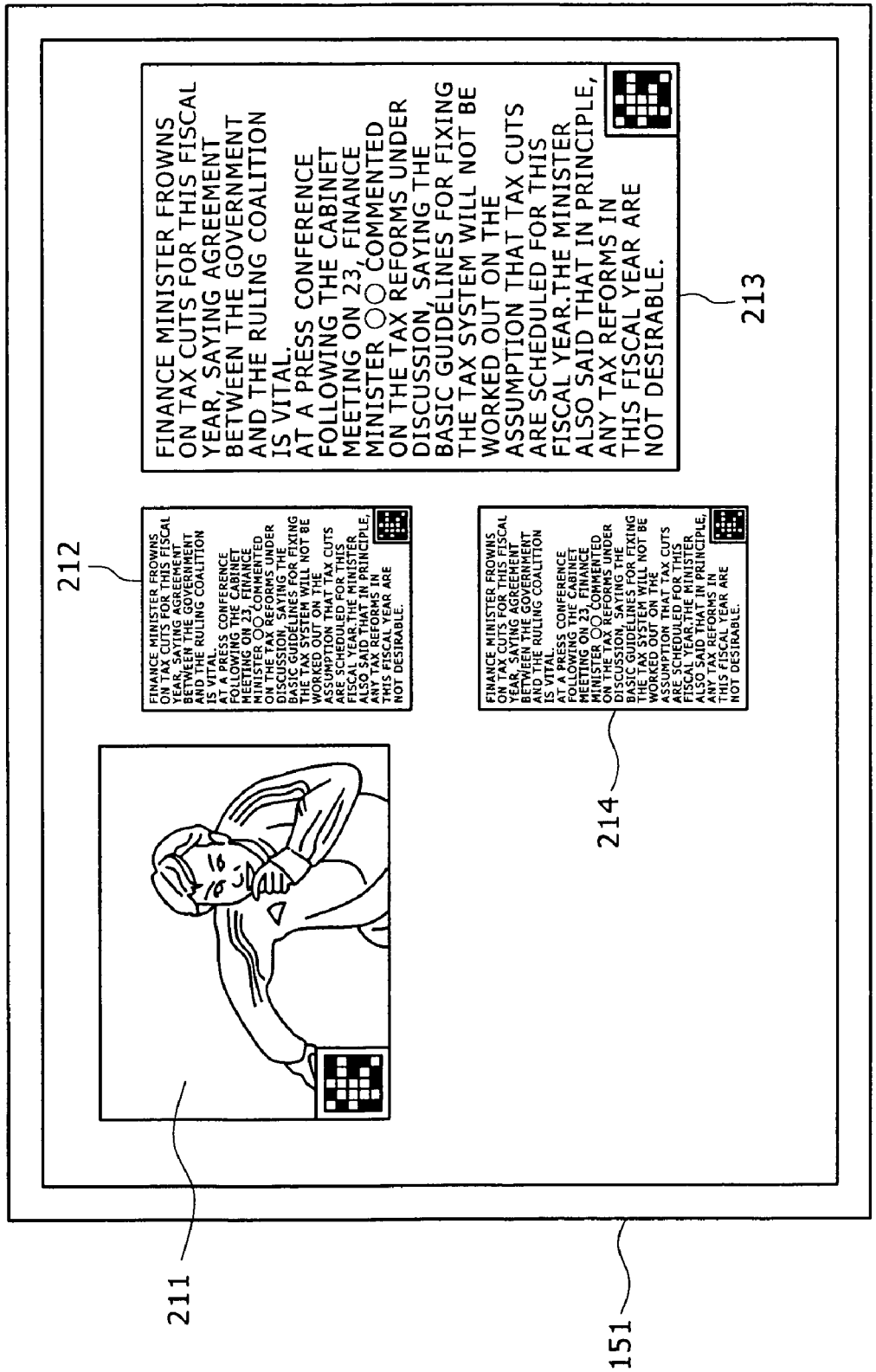
FIG. 34 is a schematic view illustrating an example of data inputted to the I/O display unit.

For example, light emitted from the light emitting surface 201A at a certain moment represents such a two-dimensional bar code (symbol) as shown in FIG. 33. Since such an apparatus on the receiver side as the video camera 101 or the I/O display unit 151 can detect ON/OFF of a plurality of light sources at a time, such a two-dimensional bar code as seen in FIG. 33 can be used so that white and black patterns may be detected collectively.

Light representative of two-dimensional bar codes $S_1$ to $S_n$ produced, for example, based on predetermined data is successively emitted from the light emitting surface 201A of the light emitting apparatus 201. The I/O display unit 151 acquires the two-dimensional bar codes $S_1$ to $S_n$ based on the outputs of the pixels which perform light receiving operation and reproduce the predetermined data selected by the light emitting apparatus 201 based on the acquired two-dimensional bar codes $S_1$ to $S_n$.

Also the decision of white/black (ON/OFF) patterns which form the two-dimensional bar codes is performed such that, for example, if an intermediate received light level is detected, then the value of the immediately preceding period is referred.

A synchronizing signal for causing the I/O display unit 151 to settle the value is added to the top of a series of two-dimensional bar codes to be successively emitted from the light emitting apparatus 201. In the example of FIG. 33, the two-dimensional bar codes $S_1$ and $S_2$ are the synchronizing signal (synchronizing symbol).

When light representative of a two-dimensional bar code of the same pattern is emitted repetitively, where one pixel of the I/O display unit 151 which is controlled so as to perform light receiving operation repetitively within a predetermined period of time, the pixel detects a number of successive values either of 1 or 0 (ON/OFF) equal to the number of synchronizing symbols. Consequently, the value for decision of a value of an information signal following the synchronizing signal is settled.

By performing communication using a two-dimensional bar code in this manner, the transmission capacity can be enhanced compared with that in an alternative case wherein a single light emitting element is used to perform communication. Accordingly, even where data have a comparatively great data amount such as an image 211 or texts 212 to 214, they can be inputted readily from the light emitting apparatus 201 to the I/O display unit 151. The image 211 and the texts 212 to 214 are selected as data to be transmitted to the I/O display unit 151 by the light emitting apparatus 201.

In the foregoing description, decision of the value performed by the I/O display unit 151 is based on the amount (received light level) of leak current generated in a pixel which performs light receiving operation. Alternatively, however, for example, an image pickup device may be embedded in each pixel of a liquid crystal display unit such that the decision is performed based on an output of the image pickup device.

Also this makes it possible for the liquid crystal display unit to apparently perform displaying and light reception similarly as in the case of the I/O display unit 151. Further, since a liquid crystal display unit wherein an image pickup device is incorporated in each pixel can perform light reception and displaying at a time, it is considered that there is a higher degree of freedom in timings of light reception and displaying than that in the alternative case wherein the I/O display unit 151 which can perform only one of light reception and displaying at a certain timing.

While the series of processes described above can be executed by hardware, it may otherwise be executed by software. In this instance, an apparatus for executing the software may be formed from such a computer as shown in FIG. 35.

Referring to FIG. 35, a central processing unit (CPU) 231 executes various processes in accordance with a program stored in a ROM (Read Only Memory) 232 or a program loaded from a storage section 238 into a RAM (Random Access Memory) 233. Also data necessary for the CPU 231 to execute the processes are suitably stored into the RAM 233.

The CPU 231, ROM 232 and RAM 233 are connected to one another by a bus 234. Also an input/output interface 235 is connected to the bus 234.

An inputting section 236 including a keyboard, a mouse and so forth, an outputting section 237 including a display unit which may be a liquid crystal display unit, an I/O display unit like the I/O display unit 151 or the like, a storage section 238 formed from a hard disk or the like, and a communication section 239 for performing a communication process through a network are connected to the input/output interface 235.

Further, as occasion demands, a drive 240 is connected to the input/output interface 235. A removable medium 241 such as a magnetic disk, an optical disk, a magneto-optical disk, a semiconductor memory or the like is suitably loaded into the drive 240, and a computer program read from the loaded medium is installed into the storage section 238 as occasion demands.

Where the series of processes is executed by software, a program which constructs the software is installed from a network or a recording medium into a computer incorporated in hardware for exclusive use or a personal computer, for example, for universal use which can execute various functions by installing various programs.

The recording medium may be formed, as seen in FIG. 35, as the removable disk 241 which may be a magnetic disk (including a flexible disk), an optical disk (including a CD-ROM (Compact Disc-Read Only Memory) and a DVD (Digital Versatile Disk)), a magneto-optical disk (including an MD (Mini-Disk)), or a semiconductor memory which has the program recorded thereon or therein and is distributed in order to provide the program to a user separately from an apparatus body, or as a ROM 232 or a hard disk included in the storage section 238 which has the program recorded therein or thereon and is provided to a user in a form wherein it is incorporated in an apparatus body in advance.

It is to be noted that, in the present specification, the steps may be but need not necessarily be processed in a time series in the order as described, and include processes which are executed in parallel or individually without being processed in a time series.

Further, in the present specification, the term "system" is used to represent an entire apparatus composed of a plurality of apparatus.

While preferred embodiments of the present invention have been described using specific terms, such description is for illustrative purposes only, and it is to be understood that changes and variations may be made without departing from the spirit or scope of the following claims.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A reception apparatus which receives, using a clock of a predetermined frequency as a reception clock, predetermined data transmitted thereto using a clock of a frequency equal to that of the reception clock as a transmission clock, comprising:

a decision section for deciding, where a sample value obtained by sampling a signal representative of the predetermined data in accordance with a cycle which depends upon the reception clock is within an intermediate range between a first range within which the value of a noticed bit can be decided to be 1 and a second range within which the value of the noticed bit can be decided to be 0, the value of the noticed bit as a value opposite to the value of the immediately preceding bit; and an acquisition section for acquiring the predetermined data based on a result of the decision by said decision section;

wherein the predetermined data have a synchronizing signal part and an information signal part, the synchronizing signal part including a pattern of 1 and 0 which is not included in the information signal part; and wherein, when said decision section settles the value of a bit depending upon the synchronizing signal part and is to decide the value of a bit following the settled bit, when the sample value is within the intermediate range between the first and second ranges, then said decision section decides the value of the noticed bit as a value opposite to the value of the immediately preceding bit.

2. The reception apparatus according to claim 1, further comprising a light reception section for receiving light from a light source which represents the predetermined data in a pattern of light emission of said light source, said decision section deciding the value of a bit which composes the predetermined data represented by a pattern of light emission of said light source based on the sample value obtained by sampling a signal representative of the level of light received by said light reception section, said acquisition section acquiring the predetermined data represented by the pattern of light emission of said light source based on a result of the decision by said decision section.

3. The reception apparatus according to claim 2, wherein, when light from a plurality of light sources is received by said light reception section, said decision section decides the value of a bit which composes the predetermined data represented by patterns of light emission of said plurality of light sources based on sample values obtained by sampling signals representative of the levels of light received by said light reception sections, and said acquisition section acquires the predetermined data represented by the patterns of light emission of said plurality of light sources based on a result of the decision by said decision section.

4. The reception apparatus according to claim 2, wherein said light reception section includes an image pickup device.

5. The reception apparatus according to claim 2, further comprising a control section for controlling operation of a display unit which includes a pixel which can perform light emitting operation and light receiving operation, said light reception section including a pixel controlled so as to perform light receiving operation under the control of said control section.

* * * * *